(12) United States Patent
Wilkinson et al.

(10) Patent No.: US 10,366,396 B2
(45) Date of Patent: Jul. 30, 2019

(54) VECTOR-BASED CHARACTERIZATIONS OF PRODUCTS AND INDIVIDUALS WITH RESPECT TO CUSTOMER SERVICE AGENT ASSISTANCE

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/624,030

(22) Filed: Jun. 15, 2017

(65) Prior Publication Data
US 2017/0364925 A1   Dec. 21, 2017

Related U.S. Application Data

(60) Provisional application No. 62/350,315, filed on Jun. 15, 2016, provisional application No. 62/351,463, (Continued)

(51) Int. Cl.
G06Q 30/00 (2012.01)

(52) U.S. Cl.
CPC ................... G06Q 30/016 (2013.01)

(58) Field of Classification Search
None
See application file for complete search history.

(56) References Cited

U.S. PATENT DOCUMENTS 6,327,574 B1   12/2001   Kramer
7,062,510 B1   6/2006   Eldering
(Continued)

FOREIGN PATENT DOCUMENTS

WO    2000070481    11/2000
WO    02033628    4/2002

OTHER PUBLICATIONS

PCT; App. No. PCT/US2017/037441; International Search Report and Written Opinion dated Sep. 6, 2017.
(Continued)

*Primary Examiner* — Thomas L Mansfield
(74) *Attorney, Agent, or Firm* — Fitch, Even, Tabin & Flannery, LLP

(57) ABSTRACT

Systems, apparatuses, and methods are provided herein for providing customer service agent assistance. A system for providing customer service agent assistance comprises a customer profile database storing customer partiality vectors for a plurality of customers, the customer partiality vectors comprise customer value vectors, a communication device, and a control circuit. The control circuit being configured to: provide a customer service agent user interface on a user device associated with a customer service agent, associate a particular customer with the customer service agent, retrieving at least one customer value vector for the particular customer from the customer profile database, and cause, via the communication device, the at least one customer value vector of the particular customer to be displayed on the customer service agent user interface of the user device.

17 Claims, 20 Drawing Sheets

Related U.S. Application Data filed on Jun. 17, 2016, provisional application No. 62/436,842, filed on Dec. 20, 2016, provisional application No. 62/485,045, filed on Apr. 13, 2017.

(56) References Cited

U.S. PATENT DOCUMENTS

| | | |
|---|---|---|
| 7,240,355 B1 | 7/2007 | Eldering |
| 7,505,921 B1 | 3/2009 | Lukas |
| 7,658,327 B2 | 2/2010 | Tuchman |
| 7,698,170 B1 | 4/2010 | Darr |
| 7,797,185 B2 | 9/2010 | Korver |
| 7,853,600 B2 | 12/2010 | Herz |
| 8,234,141 B1* | 7/2012 | Flockhart ......... G06Q 10/06311 705/7.13 |
| 8,386,285 B2 | 2/2013 | Chen |
| 8,429,026 B1 | 4/2013 | Kolawa |
| 8,666,844 B2 | 3/2014 | Shaya |
| 8,719,103 B2 | 5/2014 | Bouaziz |
| 8,793,721 B1 | 7/2014 | Sharkey |
| 8,923,489 B1 | 12/2014 | Roux |
| 9,076,146 B2 | 7/2015 | Feng |
| 9,195,758 B2 | 11/2015 | Parikh |
| 9,213,986 B1 | 12/2015 | Buchheit |
| 9,300,994 B2 | 3/2016 | Gerrity |
| 9,369,777 B2 | 6/2016 | Haberman |
| 10,009,468 B1* | 6/2018 | Svensson ............ H04M 3/5238 |
| 2001/0014868 A1 | 8/2001 | Herz |
| 2002/0120935 A1 | 8/2002 | Huber |
| 2002/0174025 A1 | 11/2002 | Hind |
| 2003/0065520 A1 | 4/2003 | Jutzi |
| 2003/0126023 A1 | 7/2003 | Crampton |
| 2003/0167222 A1 | 9/2003 | Mehrotra |
| 2004/0176966 A1 | 9/2004 | Chen |
| 2005/0189414 A1 | 9/2005 | Fano |
| 2005/0283394 A1* | 12/2005 | McGloin ................ G06Q 10/10 705/7.32 |
| 2006/0143081 A1* | 6/2006 | Argaiz ................... G06Q 30/02 705/14.53 |
| 2007/0206757 A1 | 9/2007 | Pennington |
| 2007/0244741 A1 | 10/2007 | Blume |
| 2009/0234668 A1 | 9/2009 | Wheeler |
| 2009/0234712 A1 | 9/2009 | Kolawa |
| 2010/0185580 A1 | 7/2010 | Zhu |
| 2011/0040601 A1* | 2/2011 | Bai ........................ G06Q 30/02 705/7.29 |
| 2011/0213661 A1 | 9/2011 | Milana |
| 2011/0246260 A1 | 10/2011 | Gilbert |
| 2011/0302240 A1 | 12/2011 | Saito |
| 2011/0314061 A1 | 12/2011 | Lara |
| 2011/0321075 A1 | 12/2011 | Brunkhorst |
| 2012/0130763 A1 | 5/2012 | Katz |
| 2013/0073389 A1 | 3/2013 | Heath |
| 2013/0073473 A1 | 3/2013 | Heath |
| 2013/0080208 A1 | 3/2013 | Wang |
| 2013/0091146 A1 | 4/2013 | Stanger |
| 2013/0325652 A1 | 12/2013 | Ouimet |
| 2014/0058775 A1 | 2/2014 | Siig |
| 2014/0058794 A1 | 2/2014 | Malov |
| 2014/0122228 A1 | 5/2014 | Wical |
| 2014/0236622 A1 | 8/2014 | Southam |
| 2014/0279208 A1 | 9/2014 | Nickitas |
| 2015/0032847 A1 | 1/2015 | Van Coppenolle |
| 2015/0039443 A1 | 2/2015 | Soon-Shiong |
| 2015/0149443 A1 | 5/2015 | Aravamudan |
| 2015/0161688 A1 | 6/2015 | Kimmerling |
| 2015/0195404 A1* | 7/2015 | O'Connor ............ H04M 3/5175 379/265.03 |
| 2015/0262282 A1 | 9/2015 | Walti |
| 2015/0324490 A1* | 11/2015 | Page .................. G05B 19/4183 700/98 |
| 2016/0048595 A1 | 2/2016 | Vanblon |
| 2016/0171539 A1 | 6/2016 | Ganduri |
| 2016/0171866 A1 | 6/2016 | Dupasquier |
| 2016/0239857 A1 | 8/2016 | Milton |
| 2016/0345869 A1 | 12/2016 | Rishi |
| 2017/0109806 A1* | 4/2017 | Adoni ................ G06Q 30/0631 |
| 2017/0300856 A1 | 10/2017 | Wilkinson |
| 2017/0300936 A1 | 10/2017 | Wilkinson |
| 2017/0300944 A1 | 10/2017 | Wilkinson |
| 2017/0300946 A1 | 10/2017 | Wilkinson |
| 2017/0300956 A1 | 10/2017 | Cantrell |
| 2017/0300992 A1 | 10/2017 | Wilkinson |
| 2017/0300999 A1 | 10/2017 | Wilkinson |
| 2017/0301000 A1 | 10/2017 | Morgan |
| 2017/0301001 A1 | 10/2017 | Wilkinson |
| 2017/0301002 A1 | 10/2017 | Wilkinson |
| 2017/0301008 A1 | 10/2017 | Houdek-Heis |
| 2017/0345033 A1 | 11/2017 | Wilkinson |
| 2017/0364860 A1 | 12/2017 | Wilkinson |
| 2017/0364962 A1 | 12/2017 | Wilkinson |
| 2018/0005177 A1 | 1/2018 | Wilkinson |
| 2018/0025365 A1 | 1/2018 | Wilkinson |
| 2018/0040044 A1 | 2/2018 | Mattingly |
| 2018/0053240 A1 | 2/2018 | Jones |
| 2018/0060943 A1 | 3/2018 | Mattingly |
| 2018/0082252 A1 | 3/2018 | Wilkinson |
| 2018/0107971 A1 | 4/2018 | Vukin |
| 2018/0108062 A1 | 4/2018 | McHale |
| 2018/0113431 A1 | 4/2018 | Wilkinson |
| 2018/0137461 A1 | 5/2018 | Wilkinson |
| 2018/0144397 A1 | 5/2018 | Wilkinson |
| 2018/0174101 A1 | 6/2018 | Mattingly |
| 2018/0174188 A1 | 6/2018 | Wilkinson |
| 2018/0174198 A1 | 6/2018 | Wilkinson |
| 2018/0174223 A1 | 6/2018 | Cantrell |
| 2018/0174224 A1 | 6/2018 | Wilkinson |
| 2018/0268357 A1 | 9/2018 | Cantrell |
| 2018/0285816 A1 | 10/2018 | Mattingly |
| 2018/0300677 A1 | 10/2018 | Wilkinson |
| 2018/0300788 A1 | 10/2018 | Mattingly |

OTHER PUBLICATIONS

U.S. Appl. No. 15/487,538, filed Apr. 14, 2017, Bruce W. Wilkinson.
U.S. Appl. No. 15/487,728, filed Apr. 14, 2017, Bruce W. Wilkinson.
U.S. Appl. No. 15/487,760, filed Apr. 14, 2017, Starla C. Morgan.
U.S. Appl. No. 15/487,775, filed Apr. 14, 2017, Robin Houdek-Heis.
U.S. Appl. No. 15/487,792, filed Apr. 14, 2017, Robert L. Cantrell.
U.S. Appl. No. 15/487,826, filed Apr. 14, 2017, Bruce W. Wilkinson.
U.S. Appl. No. 15/487,882, filed Apr. 14, 2017, Bruce W. Wilkinson.
U.S. Appl. No. 15/487,894, filed Apr. 14, 2017, Bruce W. Wilkinson.
U.S. Appl. No. 15/488,004, filed Apr. 14, 2017, Bruce W. Wilkinson.
U.S. Appl. No. 15/488,015, filed Apr. 14, 2017, Bruce W. Wilkinson.
U.S. Appl. No. 15/488,107, filed Apr. 14, 2017, Bruce W. Wilkinson.
U.S. Appl. No. 15/606,602, filed May 26, 2017, Bruce W. Wilkinson.
U.S. Appl. No. 15/625,599, filed Jun. 16, 2017, Bruce W. Wilkinson.
U.S. Appl. No. 15/628,282, filed Jun. 20, 2017, Bruce W. Wilkinson.
U.S. Appl. No. 15/634,862, filed Jun. 27, 2017, Bruce W. Wilkinson.
U.S. Appl. No. 15/655,339, filed Jul. 20, 2017, Bruce W. Wilkinson.
U.S. Appl. No. 15/669,546, filed Aug. 4, 2017, Todd D. Mattingly.
U.S. Appl. No. 15/678,608, filed Aug. 16, 2017, Nicholaus A. Jones.
"Amazon Alexa;" Wikipedia; https://web.archive.org/web/20160926125220/https://en.wikipedia.org/wiki/Amazon_Alexa; Sep. 26, 2016; pp. 1-4.
"Amazon Dash Buttons;" Amazon; https://web.archive.org/web/20160623172354/https://www.amazon.com/Dash-Buttons/b?ie=UTF8&node=10667898011; Jun. 23, 2016; pp. 1-8.
"Amazon Dash;" Wikipedia; https://web.archive.org/web/20160310021300/https://en.wikipedia.org/wiki/Amazon_Dash; Mar. 10, 2016; pp. 1-2.
"Amazon Echo;" Amazon; https://web.archive.org/web/20160602024155/https://www.amazon.com/Amazon-Echo-Bluetooth-Speaker-with-WiFi-Alexa/dp/B00X4WHP5E; Jun. 2, 2016; pp. 1-10.
"Predicting Customer Needs with Forward Demand;" Blue Yonder; https://www.blueyonder.com/en/products/forward-demand.html; retrieved on Mar. 16, 2016; pp. 1-11.
Gustafson, Krystina; "The anti-Amazons: Two brands shaking up retail"; http://www.cnbc.com/2016/03/22/the-anti-amazons-two-brands-shaking-up-retail.html; Mar. 28, 2016; pp. 1-8.

(56) References Cited

OTHER PUBLICATIONS

Karim, Shah; "Seven Retail Megatrends for 2020;" Chain Store Age; http://www.chainstoreage.com/article/seven-retail-megatrends-2020; Feb. 22, 2015; pp. 1-3.
Khan, Sal; "The dot product"; https://www.khanacademy.org/science/physics/magnetic-forces-and-magnetic-fields/electric-motors/v/the-dot-product; uploaded on Aug. 8, 2008, pp. 1-10.
Kohan, Shelley E.; "5 Retail Trends for 2015;" RetailNext; https://retailnext.net/en/blog/retail-trends-2015/; Feb. 24, 2015; pp. 1-4.
Lu, Haiyun; "Recommendations Based on Purchase Patterns;" International Journal of Machine Learning and Computing; vol. 4, No. 6; Dec. 2014; pp. 501-504.
Neo4J; "Walmart uses Neo4j to optimize customer experience with personal recommendations"; http://info.neo4j.com/rs/neotechnology/images/neo4j-casestudy-walmart.pdf; available at least as early as Mar. 29, 2016; pp. 1-2.
U.S. Appl. No. 15/685,981, filed Aug. 24, 2017, Todd D. Mattingly.
U.S. Appl. No. 15/704,878, filed Sep. 14, 2017, Bruce W. Wilkinson.
U.S. Appl. No. 15/782,509, filed Oct. 12, 2017, Greg N. Vukin.
U.S. Appl. No. 15/782,555, filed Oct. 12, 2017, Todd D. Mattingly.
U.S. Appl. No. 15/782,559, filed Oct. 12, 2017, Bruce W. Wilkinson.
U.S. Appl. No. 15/783,551, filed Oct. 13, 2017, Bruce W. Wilkinson.
U.S. Appl. No. 15/783,645, filed Oct. 13, 2017, Bruce W. Wilkinson.
U.S. Appl. No. 15/783,668, filed Oct. 13, 2017, Brian G. McHale.
U.S. Appl. No. 15/783,787, filed Oct. 13, 2017, Robert L. Cantrell.
U.S. Appl. No. 15/783,825, filed Oct. 13, 2017, Bruce W. Wilkinson.
U.S. Appl. No. 15/783,929, filed Oct. 13, 2017, Bruce W. Wilkinson.
U.S. Appl. No. 15/783,960, filed Oct. 13, 2017, Bruce W. Wilkinson.
U.S. Appl. No. 15/921,540, filed Mar. 14, 2018, Robert L. Cantrell.
U.S. Appl. No. 15/939,788, filed Mar. 29, 2018, Todd D. Mattingly.
U.S. Appl. No. 15/947,380, filed Apr. 6, 2018, Bruce W. Wilkinson.
U.S. Appl. No. 15/952,494, filed Apr. 13, 2018, Bruce W. Wilkinson.
U.S. Appl. No. 15/953,113, filed Apr. 13, 2018, Todd D. Mattingly.

\* cited by examiner

VECTOR-BASED CHARACTERIZATIONS OF PRODUCTS AND INDIVIDUALS WITH RESPECT TO CUSTOMER SERVICE AGENT ASSISTANCE

RELATED APPLICATION(S)

This application claims the benefit of U.S. Provisional application No. 62/436,842, filed Dec. 20, 2016, U.S. Provisional application No. 62/485,045, filed Apr. 13, 2017, U.S. Provisional application No. 62/351,463, filed Jun. 17, 2016, and U.S. Provisional application No. 62/350,315, filed Jun. 15, 2016 which are all incorporated by reference in their entirety herein.

TECHNICAL FIELD

These teachings relate generally to providing products and services to individuals.

BACKGROUND

Various shopping paradigms are known in the art. One approach of long-standing use essentially comprises displaying a variety of different goods at a shared physical location and allowing consumers to view/experience those offerings as they wish to thereby make their purchasing selections. This model is being increasingly challenged due at least in part to the logistical and temporal inefficiencies that accompany this approach and also because this approach does not assure that a product best suited to a particular consumer will in fact be available for that consumer to purchase at the time of their visit.

Increasing efforts are being made to present a given consumer with one or more purchasing options that are selected based upon some preference of the consumer. When done properly, this approach can help to avoid presenting the consumer with things that they might not wish to consider. That said, existing preference-based approaches nevertheless leave much to be desired. Information regarding preferences, for example, may tend to be very product specific and accordingly may have little value apart from use with a very specific product or product category. As a result, while helpful, a preferences-based approach is inherently very limited in scope and offers only a very weak platform by which to assess a wide variety of product and service categories.

BRIEF DESCRIPTION OF THE DRAWINGS

The above needs are at least partially met through provision of the vector-based characterizations of products described in the following detailed description, particularly when studied in conjunction with the drawings, wherein.

Figure 1:
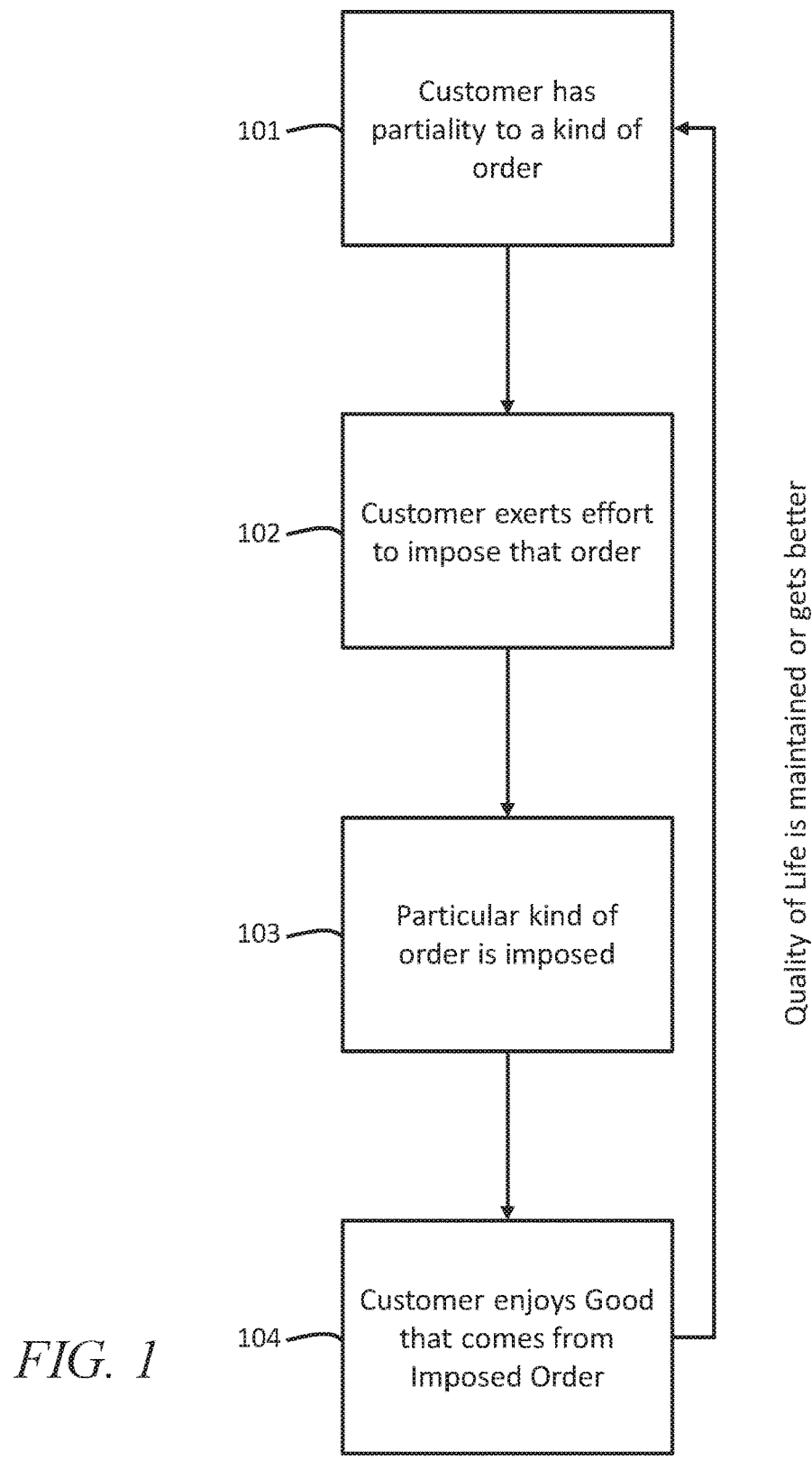
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, many of these embodiments provide for a memory having information stored therein that includes partiality information for each of a plurality of persons in the form of a plurality of partiality vectors for each of the persons wherein each partiality vector has at least one of a magnitude and an angle that corresponds to a magnitude of the person's belief in an amount of good that comes from an order associated with that partiality. This memory can also contain vectorized characterizations for each of a plurality of products, wherein each of the vectorized characterizations includes a measure regarding an extent to which a corresponding one of the products accords with a corresponding one of the plurality of partiality vectors.

Rules can then be provided that use the aforementioned information in support of a wide variety of activities and results. Although the described vector-based approaches bear little resemblance (if any) (conceptually or in practice) to prior approaches to understanding and/or metricizing a given person's product/service requirements, these approaches yield numerous benefits including, at least in some cases, reduced memory requirements, an ability to accommodate (both initially and dynamically over time) an essentially endless number and variety of partialities and/or product attributes, and processing/comparison capabilities that greatly ease computational resource requirements and/or greatly reduced time-to-solution results.

So configured, these teachings can constitute, for example, a method for automatically correlating a particular product with a particular person by using a control circuit to obtain a set of rules that define the particular product from amongst a plurality of candidate products for the particular person as a function of vectorized representations of partialities for the particular person and vectorized characterizations for the candidate products. This control circuit can also obtain partiality information for the particular person in the form of a plurality of partiality vectors that each have at least one of a magnitude and an angle that corresponds to a magnitude of the particular person's belief in an amount of good that comes from an order associated with that partiality and vectorized characterizations for each of the candidate products, wherein each of the vectorized characterizations indicates a measure regarding an extent to which a corresponding one of the candidate products accords with a corresponding one of the plurality of partiality vectors. The control circuit can then generate an output comprising identification of the particular product by evaluating the partiality vectors and the vectorized characterizations against the set of rules.

The aforementioned set of rules can include, for example, comparing at least some of the partiality vectors for the particular person to each of the vectorized characterizations for each of the candidate products using vector dot product calculations. By another approach, in lieu of the foregoing or in combination therewith, the aforementioned set of rules can include using the partiality vectors and the vectorized characterizations to define a plurality of solutions that collectively form a multi-dimensional surface and selecting the particular product from the multi-dimensional surface. In such a case the set of rules can further include accessing other information (such as objective information) for the particular person comprising information other than partiality vectors and using the other information to constrain a selection area on the multi-dimensional surface from which the particular product can be selected.

People tend to be partial to ordering various aspects of their lives, which is to say, people are partial to having things well arranged per their own personal view of how things should be. As a result, anything that contributes to the proper ordering of things regarding which a person has partialities represents value to that person. Quite literally, improving order reduces entropy for the corresponding person (i.e., a reduction in the measure of disorder present in that particular aspect of that person's life) and that improvement in order/reduction in disorder is typically viewed with favor by the affected person.

Generally speaking a value proposition must be coherent (logically sound) and have "force." Here, force takes the form of an imperative. When the parties to the imperative have a reputation of being trustworthy and the value proposition is perceived to yield a good outcome, then the imperative becomes anchored in the center of a belief that "this is something that I must do because the results will be good for me." With the imperative so anchored, the corresponding material space can be viewed as conforming to the order specified in the proposition that will result in the good outcome.

Pursuant to these teachings a belief in the good that comes from imposing a certain order takes the form of a value proposition. It is a set of coherent logical propositions by a trusted source that, when taken together, coalesce to form an imperative that a person has a personal obligation to order their lives because it will return a good outcome which improves their quality of life. This imperative is a value force that exerts the physical force (effort) to impose the desired order. The inertial effects come from the strength of the belief. The strength of the belief comes from the force of the value argument (proposition). And the force of the value proposition is a function of the perceived good and trust in the source that convinced the person's belief system to order material space accordingly. A belief remains constant until acted upon by a new force of a trusted value argument. This is at least a significant reason why the routine in people's lives remains relatively constant.

Newton's three laws of motion have a very strong bearing on the present teachings. Stated summarily, Newton's first law holds that an object either remains at rest or continues to move at a constant velocity unless acted upon by a force, the second law holds that the vector sum of the forces F on an object equal the mass m of that object multiplied by the acceleration a of the object (i.e., $F=ma$), and the third law holds that when one body exerts a force on a second body, the second body simultaneously exerts a force equal in magnitude and opposite in direction on the first body.

Relevant to both the present teachings and Newton's first law, beliefs can be viewed as having inertia. In particular, once a person believes that a particular order is good, they tend to persist in maintaining that belief and resist moving away from that belief. The stronger that belief the more force an argument and/or fact will need to move that person away from that belief to a new belief.

Relevant to both the present teachings and Newton's second law, the "force" of a coherent argument can be viewed as equaling the "mass" which is the perceived Newtonian effort to impose the order that achieves the aforementioned belief in the good which an imposed order brings multiplied by the change in the belief of the good which comes from the imposition of that order. Consider that when a change in the value of a particular order is observed then there must have been a compelling value claim influencing that change. There is a proportionality in that the greater the change the stronger the value argument. If a person values a particular activity and is very diligent to do that activity even when facing great opposition, we say they are dedicated, passionate, and so forth. If they stop doing the activity, it begs the question, what made them stop? The answer to that question needs to carry enough force to account for the change.

And relevant to both the present teachings and Newton's third law, for every effort to impose good order there is an equal and opposite good reaction.

FIG. 1 provides a simple illustrative example in these regards. At block 101 it is understood that a particular person has a partiality (to a greater or lesser extent) to a particular kind of order. At block 102 that person willingly exerts effort to impose that order to thereby, at block 103, achieve an arrangement to which they are partial. And at block 104, this person appreciates the "good" that comes from successfully imposing the order to which they are partial, in effect establishing a positive feedback loop.

Figure 2:
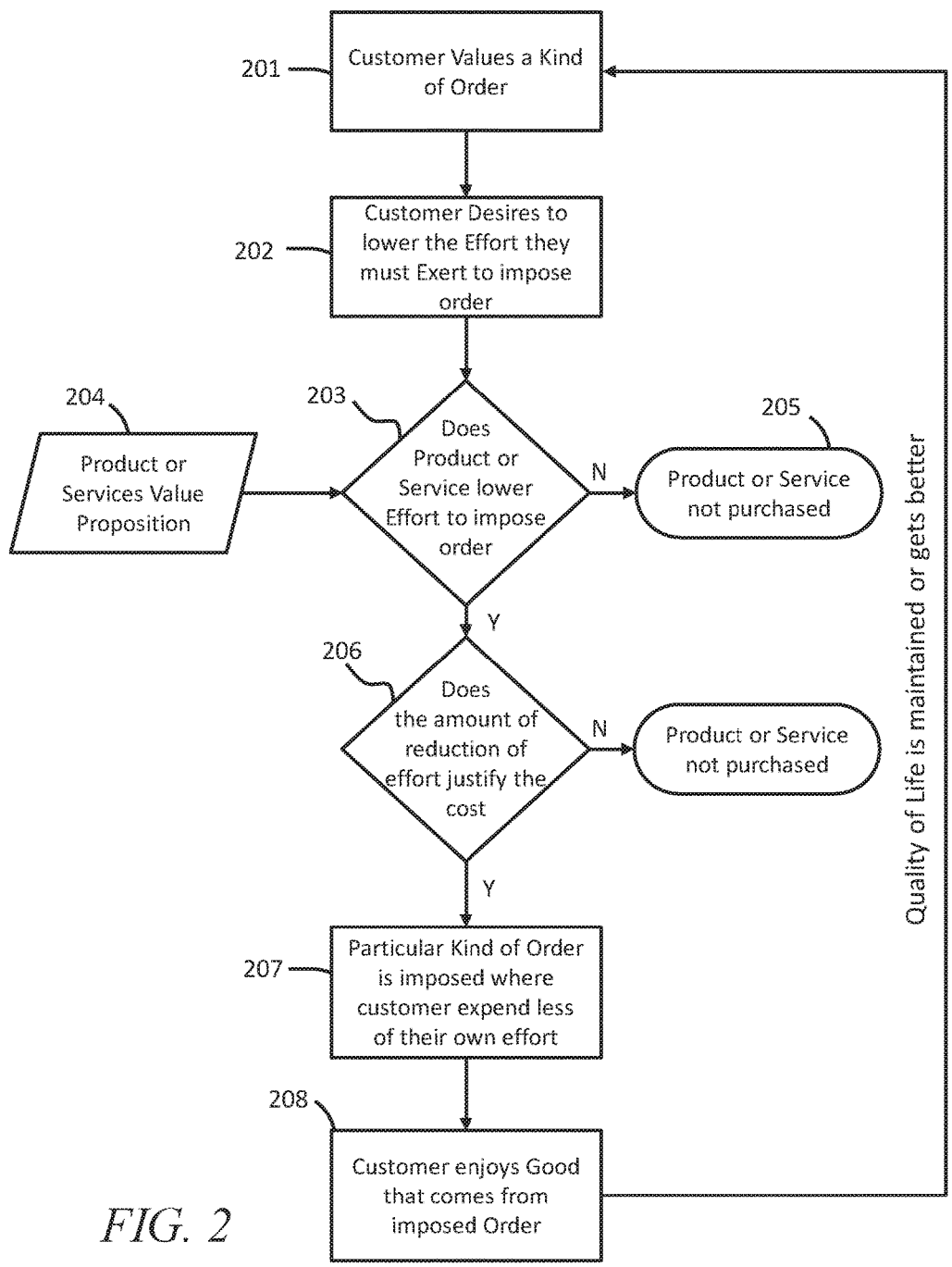
FIG. 2 comprises a flow diagram as configured in accordance with various embodiments of these teachings.

Understanding these partialities to particular kinds of order can be helpful to understanding how receptive a particular person may be to purchasing a given product or service. FIG. 2 provides a simple illustrative example in these regards. At block 201 it is understood that a particular person values a particular kind of order. At block 202 it is understood (or at least presumed) that this person wishes to lower the effort (or is at least receptive to lowering the effort) that they must personally exert to impose that order. At decision block 203 (and with access to information 204 regarding relevant products and or services) a determination can be made whether a particular product or service lowers the effort required by this person to impose the desired order. When such is not the case, it can be concluded that the person will not likely purchase such a product/service 205 (presuming better choices are available).

When the product or service does lower the effort required to impose the desired order, however, at block 206 a determination can be made as to whether the amount of the reduction of effort justifies the cost of purchasing and/or using the proffered product/service. If the cost does not justify the reduction of effort, it can again be concluded that the person will not likely purchase such a product/service 205. When the reduction of effort does justify the cost, however, this person may be presumed to want to purchase the product/service and thereby achieve the desired order (or at least an improvement with respect to that order) with less expenditure of their own personal effort (block 207) and thereby achieve, at block 208, corresponding enjoyment or appreciation of that result.

To facilitate such an analysis, the applicant has determined that factors pertaining to a person's partialities can be quantified and otherwise represented as corresponding vectors (where "vector" will be understood to refer to a geometric object/quantity having both an angle and a length/magnitude). These teachings will accommodate a variety of differing bases for such partialities including, for example, a person's values, affinities, aspirations, and preferences.

A value is a person's principle or standard of behavior, their judgment of what is important in life. A person's values represent their ethics, moral code, or morals and not a mere unprincipled liking or disliking of something. A person's value might be a belief in kind treatment of animals, a belief in cleanliness, a belief in the importance of personal care, and so forth.

An affinity is an attraction (or even a feeling of kinship) to a particular thing or activity. Examples including such a feeling towards a participatory sport such as golf or a spectator sport (including perhaps especially a particular team such as a particular professional or college football team), a hobby (such as quilting, model railroading, and so forth), one or more components of popular culture (such as a particular movie or television series, a genre of music or a particular musical performance group, or a given celebrity, for example), and so forth.

"Aspirations" refer to longer-range goals that require months or even years to reasonably achieve. As used herein "aspirations" does not include mere short term goals (such as making a particular meal tonight or driving to the store and back without a vehicular incident). The aspired-to goals, in turn, are goals pertaining to a marked elevation in one's core competencies (such as an aspiration to master a particular game such as chess, to achieve a particular articulated and recognized level of martial arts proficiency, or to attain a particular articulated and recognized level of cooking proficiency), professional status (such as an aspiration to receive a particular advanced education degree, to pass a professional examination such as a state Bar examination of a Certified Public Accountants examination, or to become Board certified in a particular area of medical practice), or life experience milestone (such as an aspiration to climb Mount Everest, to visit every state capital, or to attend a game at every major league baseball park in the United States). It will further be understood that the goal(s) of an aspiration is not something that can likely merely simply happen of its own accord; achieving an aspiration requires an intelligent effort to order one's life in a way that increases the likelihood of actually achieving the corresponding goal or goals to which that person aspires. One aspires to one day run their own business as versus, for example, merely hoping to one day win the state lottery.

A preference is a greater liking for one alternative over another or others. A person can prefer, for example, that their steak is cooked "medium" rather than other alternatives such as "rare" or "well done" or a person can prefer to play golf in the morning rather than in the afternoon or evening. Preferences can and do come into play when a given person makes purchasing decisions at a retail shopping facility. Preferences in these regards can take the form of a preference for a particular brand over other available brands or a preference for economy-sized packaging as versus, say, individual serving-sized packaging.

Values, affinities, aspirations, and preferences are not necessarily wholly unrelated. It is possible for a person's values, affinities, or aspirations to influence or even dictate their preferences in specific regards. For example, a person's moral code that values non-exploitive treatment of animals may lead them to prefer foods that include no animal-based ingredients and hence to prefer fruits and vegetables over beef and chicken offerings. As another example, a person's affinity for a particular musical group may lead them to prefer clothing that directly or indirectly references or otherwise represents their affinity for that group. As yet another example, a person's aspirations to become a Certified Public Accountant may lead them to prefer business-related media content.

While a value, affinity, or aspiration may give rise to or otherwise influence one or more corresponding preferences, however, is not to say that these things are all one and the same; they are not. For example, a preference may represent either a principled or an unprincipled liking for one thing over another, while a value is the principle itself. Accordingly, as used herein it will be understood that a partiality can include, in context, any one or more of a value-based, affinity-based, aspiration-based, and/or preference-based partiality unless one or more such features is specifically excluded per the needs of a given application setting.

Information regarding a given person's partialities can be acquired using any one or more of a variety of information-gathering and/or analytical approaches. By one simple approach, a person may voluntarily disclose information regarding their partialities (for example, in response to an online questionnaire or survey or as part of their social media presence). By another approach, the purchasing history for a given person can be analyzed to intuit the partialities that led to at least some of those purchases. By yet another approach demographic information regarding a particular person can serve as yet another source that sheds light on their partialities. Other ways that people reveal how they order their lives include but are not limited to: (1) their social networking profiles and behaviors (such as the things they "like" via Facebook, the images they post via Pinterest, informal and formal comments they initiate or otherwise provide in response to third-party postings including statements regarding their own personal long-term goals, the persons/topics they follow via Twitter, the photographs they publish via Picasso, and so forth); (2) their Internet surfing history; (3) their on-line or otherwise-published affinity-based memberships; (4) real-time (or delayed) information (such as steps walked, calories burned, geographic location, activities experienced, and so forth) from any of a variety of personal sensors (such as smart phones, tablet/pad-styled computers, fitness wearables, Global Positioning System devices, and so forth) and the so-called Internet of Things (such as smart refrigerators and pantries, entertainment and information platforms, exercise and sporting equipment, and so forth); (5) instructions, selections, and other inputs (including inputs that occur within augmented-reality user environments) made by a person via any of a variety of interactive interfaces (such as keyboards and cursor control devices, voice recognition, gesture-based controls, and eye tracking-based controls), and so forth.

The present teachings employ a vector-based approach to facilitate characterizing, representing, understanding, and leveraging such partialities to thereby identify products (and/or services) that will, for a particular corresponding consumer, provide for an improved or at least a favorable corresponding ordering for that consumer. Vectors are directed quantities that each have both a magnitude and a direction. Per the applicant's approach these vectors have a real, as versus a metaphorical, meaning in the sense of Newtonian physics. Generally speaking, each vector represents order imposed upon material space-time by a particular partiality.

Figure 3:
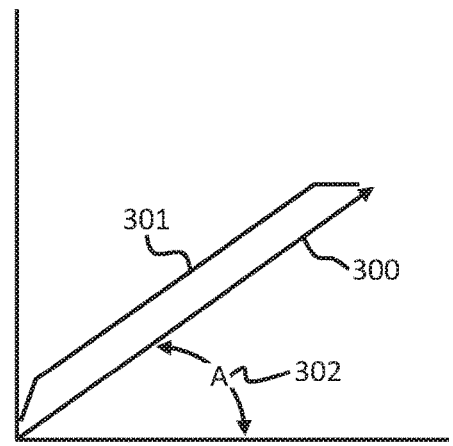
FIG. 3 comprises a graphic representation as configured in accordance with various embodiments of these teachings.

FIG. 3 provides some illustrative examples in these regards. By one approach the vector 300 has a corresponding magnitude 301 (i.e., length) that represents the magnitude of the strength of the belief in the good that comes from that imposed order (which belief, in turn, can be a function, relatively speaking, of the extent to which the order for this particular partiality is enabled and/or achieved). In this case, the greater the magnitude 301, the greater the strength of that belief and vice versa. Per another example, the vector 300 has a corresponding angle A 302 that instead represents the foregoing magnitude of the strength of the belief (and where, for example, an angle of 0° represents no such belief and an angle of 90° represents a highest magnitude in these regards, with other ranges being possible as desired).

Accordingly, a vector serving as a partiality vector can have at least one of a magnitude and an angle that corresponds to a magnitude of a particular person's belief in an amount of good that comes from an order associated with a particular partiality.

Applying force to displace an object with mass in the direction of a certain partiality-based order creates worth for a person who has that partiality. The resultant work (i.e., that force multiplied by the distance the object moves) can be viewed as a worth vector having a magnitude equal to the accomplished work and having a direction that represents the corresponding imposed order. If the resultant displacement results in more order of the kind that the person is partial to then the net result is a notion of "good." This "good" is a real quantity that exists in meta-physical space much like work is a real quantity in material space. The link between the "good" in meta-physical space and the work in material space is that it takes work to impose order that has value.

In the context of a person, this effort can represent, quite literally, the effort that the person is willing to exert to be compliant with (or to otherwise serve) this particular partiality. For example, a person who values animal rights would have a large magnitude worth vector for this value if they exerted considerable physical effort towards this cause by, for example, volunteering at animal shelters or by attending protests of animal cruelty.

While these teachings will readily employ a direct measurement of effort such as work done or time spent, these teachings will also accommodate using an indirect measurement of effort such as expense; in particular, money. In many cases people trade their direct labor for payment. The labor may be manual or intellectual. While salaries and payments can vary significantly from one person to another, a same sense of effort applies at least in a relative sense.

As a very specific example in these regards, there are wristwatches that require a skilled craftsman over a year to make. The actual aggregated amount of force applied to displace the small components that comprise the wristwatch would be relatively very small. That said, the skilled craftsman acquired the necessary skill to so assemble the wristwatch over many years of applying force to displace thousands of little parts when assembly previous wristwatches. That experience, based upon a much larger aggregation of previously-exerted effort, represents a genuine part of the "effort" to make this particular wristwatch and hence is fairly considered as part of the wristwatch's worth.

The conventional forces working in each person's mind are typically more-or-less constantly evaluating the value propositions that correspond to a path of least effort to thereby order their lives towards the things they value. A key reason that happens is because the actual ordering occurs in material space and people must exert real energy in pursuit of their desired ordering. People therefore naturally try to find the path with the least real energy expended that still moves them to the valued order. Accordingly, a trusted value proposition that offers a reduction of real energy will be embraced as being "good" because people will tend to be partial to anything that lowers the real energy they are required to exert while remaining consistent with their partialities.

Figure 4:
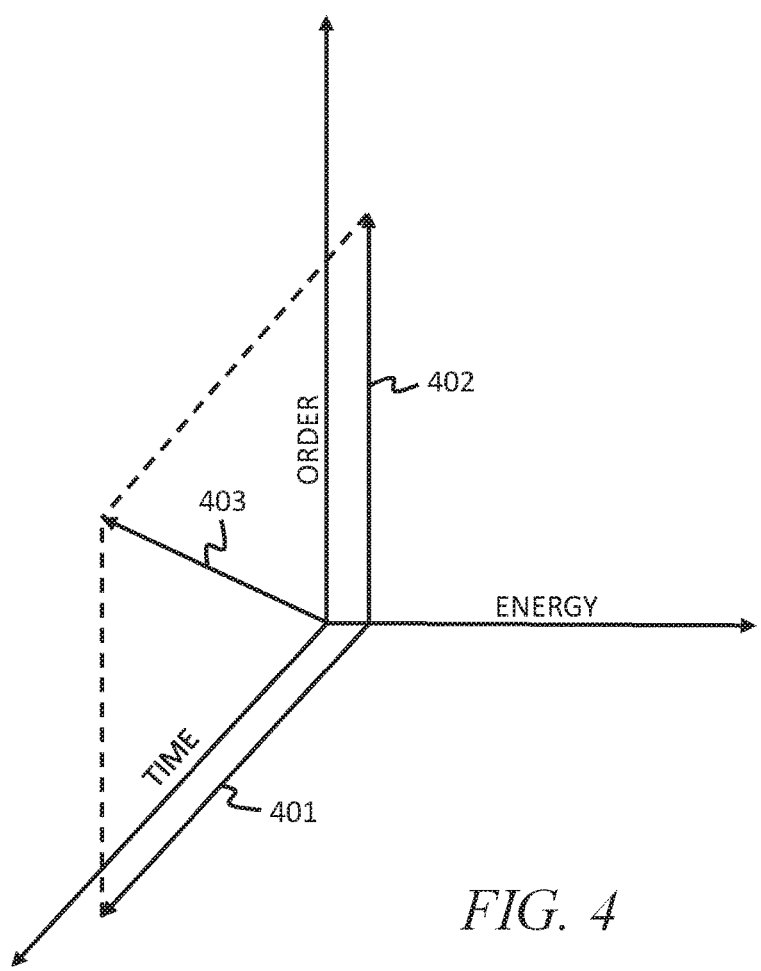
FIG. 4 comprises a graph as configured in accordance with various embodiments of these teachings.

FIG. 4 presents a space graph that illustrates many of the foregoing points. A first vector 401 represents the time required to make such a wristwatch while a second vector 402 represents the order associated with such a device (in this case, that order essentially represents the skill of the craftsman). These two vectors 401 and 402 in turn sum to form a third vector 403 that constitutes a value vector for this wristwatch. This value vector 403, in turn, is offset with respect to energy (i.e., the energy associated with manufacturing the wristwatch).

A person partial to precision and/or to physically presenting an appearance of success and status (and who presumably has the wherewithal) may, in turn, be willing to spend $100,000 for such a wristwatch. A person able to afford such a price, of course, may themselves be skilled at imposing a certain kind of order that other persons are partial to such that the amount of physical work represented by each spent dollar is small relative to an amount of dollars they receive when exercising their skill(s). (Viewed another way, wearing an expensive wristwatch may lower the effort required for such a person to communicate that their own personal success comes from being highly skilled in a certain order of high worth.)

Generally speaking, all worth comes from imposing order on the material space-time. The worth of a particular order generally increases as the skill required to impose the order increases. Accordingly, unskilled labor may exchange $10 for every hour worked where the work has a high content of unskilled physical labor while a highly-skilled data scientist may exchange $75 for every hour worked with very little accompanying physical effort.

Consider a simple example where both of these laborers are partial to a well-ordered lawn and both have a corresponding partiality vector in those regards with a same magnitude. To observe that partiality the unskilled laborer may own an inexpensive push power lawn mower that this person utilizes for an hour to mow their lawn. The data scientist, on the other hand, pays someone else $75 in this example to mow their lawn. In both cases these two individuals traded one hour of worth creation to gain the same worth (to them) in the form of a well-ordered lawn; the unskilled laborer in the form of direct physical labor and the data scientist in the form of money that required one hour of their specialized effort to earn.

This same vector-based approach can also represent various products and services. This is because products and services have worth (or not) because they can remove effort (or fail to remove effort) out of the customer's life in the direction of the order to which the customer is partial. In particular, a product has a perceived effort embedded into each dollar of cost in the same way that the customer has an amount of perceived effort embedded into each dollar earned. A customer has an increased likelihood of responding to an exchange of value if the vectors for the product and the customer's partiality are directionally aligned and where the magnitude of the vector as represented in monetary cost is somewhat greater than the worth embedded in the customer's dollar.

Put simply, the magnitude (and/or angle) of a partiality vector for a person can represent, directly or indirectly, a corresponding effort the person is willing to exert to pursue that partiality. There are various ways by which that value can be determined. As but one non-limiting example in these regards, the magnitude/angle V of a particular partiality vector can be expressed as:

$$V = \begin{bmatrix} X_1 \\ \vdots \\ X_n \end{bmatrix} [W_1 \quad \ldots \quad W_n]$$

where X refers to any of a variety of inputs (such as those described above) that can impact the characterization of a particular partiality (and where these teachings will accommodate either or both subjective and objective inputs as desired) and W refers to weighting factors that are appropriately applied the foregoing input values (and where, for example, these weighting factors can have values that themselves reflect a particular person's consumer personality or otherwise as desired and can be static or dynamically valued in practice as desired).

In the context of a product (or service) the magnitude/angle of the corresponding vector can represent the reduction of effort that must be exerted when making use of this product to pursue that partiality, the effort that was expended in order to create the product/service, the effort that the person perceives can be personally saved while nevertheless promoting the desired order, and/or some other corresponding effort. Taken as a whole the sum of all the vectors must be perceived to increase the overall order to be considered a good product/service.

It may be noted that while reducing effort provides a very useful metric in these regards, it does not necessarily follow that a given person will always gravitate to that which most reduces effort in their life. This is at least because a given person's values (for example) will establish a baseline against which a person may eschew some goods/services that might in fact lead to a greater overall reduction of effort but which would conflict, perhaps fundamentally, with their values. As a simple illustrative example, a given person might value physical activity. Such a person could experience reduced effort (including effort represented via monetary costs) by simply sitting on their couch, but instead will pursue activities that involve that valued physical activity. That said, however, the goods and services that such a person might acquire in support of their physical activities are still likely to represent increased order in the form of reduced effort where that makes sense. For example, a person who favors rock climbing might also favor rock climbing clothing and supplies that render that activity safer to thereby reduce the effort required to prevent disorder as a consequence of a fall (and consequently increasing the good outcome of the rock climber's quality experience).

By forming reliable partiality vectors for various individuals and corresponding product characterization vectors for a variety of products and/or services, these teachings provide a useful and reliable way to identify products/services that accord with a given person's own partialities (whether those partialities are based on their values, their affinities, their preferences, or otherwise).

It is of course possible that partiality vectors may not be available yet for a given person due to a lack of sufficient specific source information from or regarding that person. In this case it may nevertheless be possible to use one or more partiality vector templates that generally represent certain groups of people that fairly include this particular person. For example, if the person's gender, age, academic status/achievements, and/or postal code are known it may be useful to utilize a template that includes one or more partiality vectors that represent some statistical average or norm of other persons matching those same characterizing parameters. (Of course, while it may be useful to at least begin to employ these teachings with certain individuals by using one or more such templates, these teachings will also accommodate modifying (perhaps significantly and perhaps quickly) such a starting point over time as part of developing a more personal set of partiality vectors that are specific to the individual.) A variety of templates could be developed based, for example, on professions, academic pursuits and achievements, nationalities and/or ethnicities, characterizing hobbies, and the like.

Figure 5:
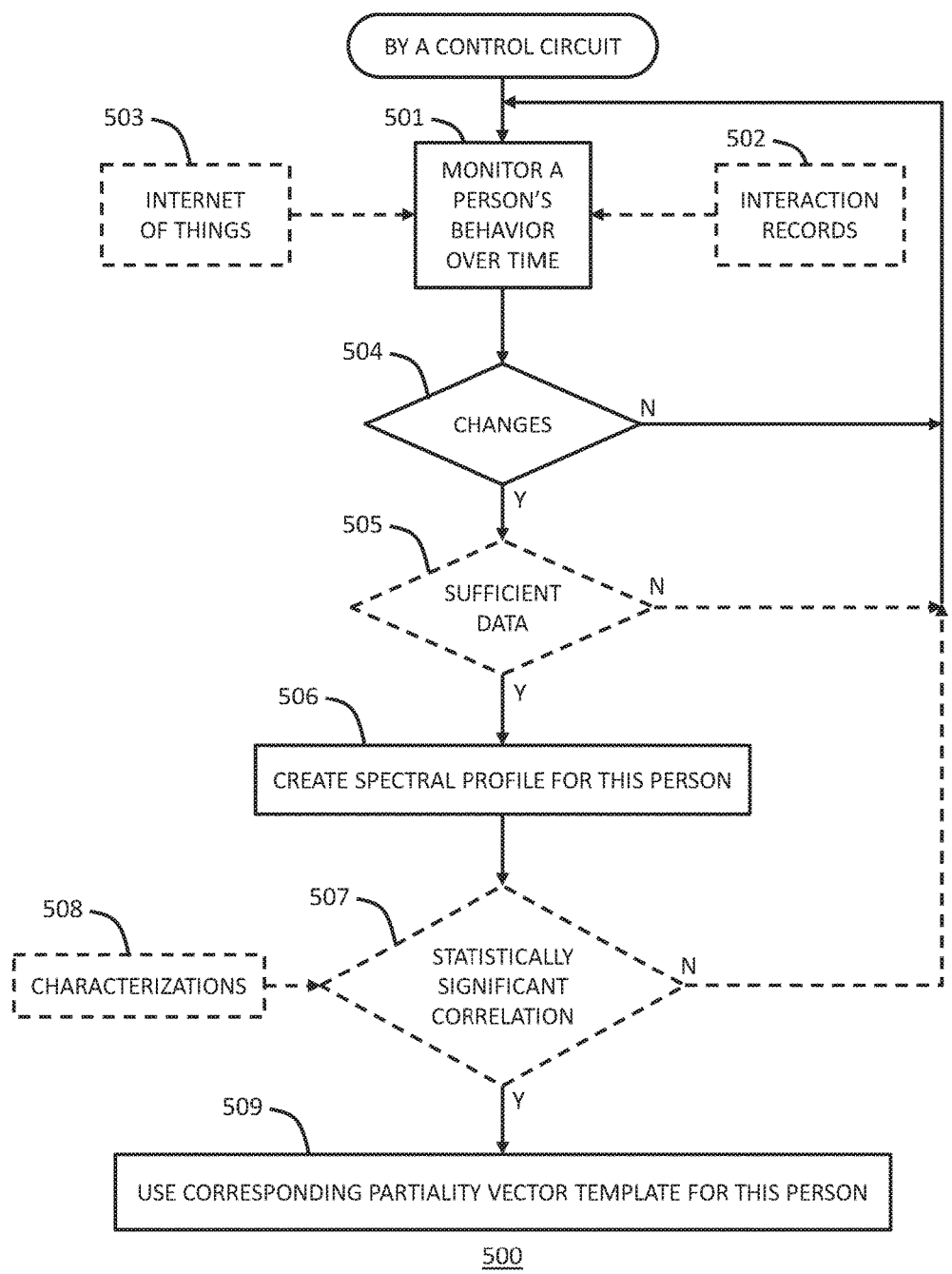
FIG. 5 comprises a flow diagram as configured in accordance with various embodiments of these teachings.

FIG. 5 presents a process 500 that illustrates yet another approach in these regards. For the sake of an illustrative example it will be presumed here that a control circuit of choice (with useful examples in these regards being presented further below) carries out one or more of the described steps/actions.

At block 501 the control circuit monitors a person's behavior over time. The range of monitored behaviors can vary with the individual and the application setting. By one approach, only behaviors that the person has specifically approved for monitoring are so monitored.

As one example in these regards, this monitoring can be based, in whole or in part, upon interaction records 502 that reflect or otherwise track, for example, the monitored person's purchases. This can include specific items purchased by the person, from whom the items were purchased, where the items were purchased, how the items were purchased (for example, at a bricks-and-mortar physical retail shopping facility or via an on-line shopping opportunity), the price paid for the items, and/or which items were returned and when), and so forth.

As another example in these regards the interaction records 502 can pertain to the social networking behaviors of the monitored person including such things as their "likes," their posted comments, images, and tweets, affinity group affiliations, their on-line profiles, their playlists and other indicated "favorites," and so forth. Such information can sometimes comprise a direct indication of a particular partiality or, in other cases, can indirectly point towards a particular partiality and/or indicate a relative strength of the person's partiality.

Other interaction records of potential interest include but are not limited to registered political affiliations and activities, credit reports, military-service history, educational and employment history, and so forth.

As another example, in lieu of the foregoing or in combination therewith, this monitoring can be based, in whole or in part, upon sensor inputs from the Internet of Things (TOT) 503. The Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure. Some experts estimate that the Internet of Things will consist of almost 50 billion such objects by 2020. (Further description in these regards appears further herein.)

Depending upon what sensors a person encounters, information can be available regarding a person's travels, lifestyle, calorie expenditure over time, diet, habits, interests and affinities, choices and assumed risks, and so forth. This process 500 will accommodate either or both real-time or non-real time access to such information as well as either or both push and pull-based paradigms.

By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives).

At block 504 this process 500 provides for detecting changes to that established routine. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon detecting a change, at optional block 505 this process 500 will accommodate assessing whether the detected change constitutes a sufficient amount of data to warrant proceeding further with the process. This assessment can comprise, for example, assessing whether a sufficient number (i.e., a predetermined number) of instances of this particular detected change have occurred over some predetermined period of time. As another example, this assessment can comprise assessing whether the specific details of the detected change are sufficient in quantity and/or quality to warrant further processing. For example, merely detecting that the person has not arrived at their usual 6 PM-Wednesday dance class may not be enough information, in and of itself, to warrant further processing, in which case the information regarding the detected change may be discarded or, in the alternative, cached for further consideration and use in conjunction or aggregation with other, later-detected changes.

Figure 6:
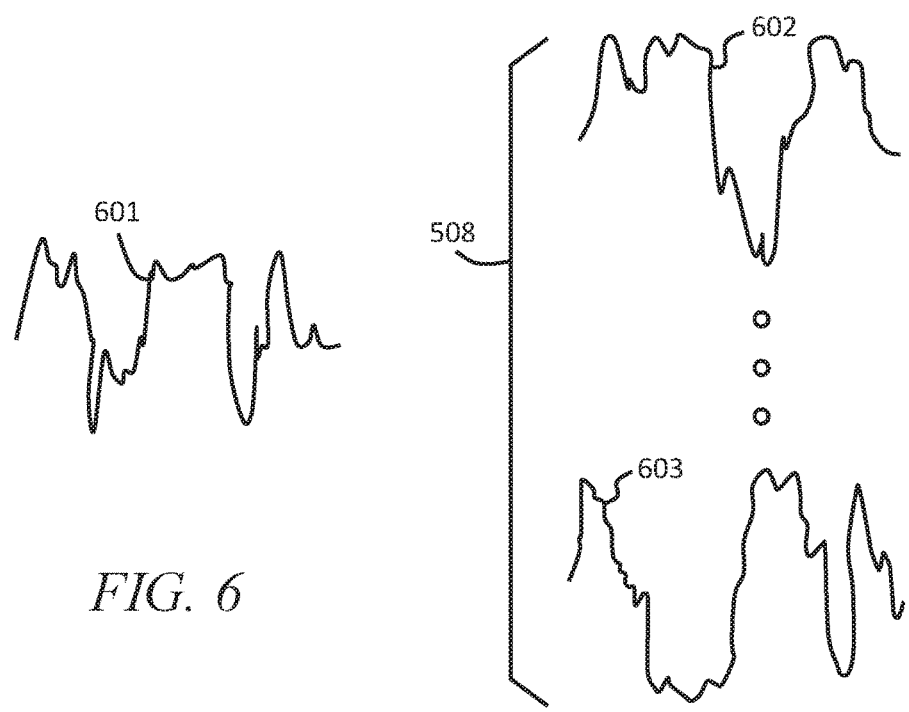
FIG. 6 comprises a graphic representation as configured in accordance with various embodiments of these teachings.

At block 507 this process 500 uses these detected changes to create a spectral profile for the monitored person. FIG. 6 provides an illustrative example in these regards with the spectral profile denoted by reference numeral 601. In this illustrative example the spectral profile 601 represents changes to the person's behavior over a given period of time (such as an hour, a day, a week, or some other temporal window of choice). Such a spectral profile can be as multidimensional as may suit the needs of a given application setting.

At optional block 507 this process 500 then provides for determining whether there is a statistically significant correlation between the aforementioned spectral profile and any of a plurality of like characterizations 508. The like characterizations 508 can comprise, for example, spectral profiles that represent an average of groupings of people who share many of the same (or all of the same) identified partialities. As a very simple illustrative example in these regards, a first such characterization 602 might represent a composite view of a first group of people who have three similar partialities but a dissimilar fourth partiality while another of the characterizations 603 might represent a composite view of a different group of people who share all four partialities.

The aforementioned "statistically significant" standard can be selected and/or adjusted to suit the needs of a given application setting. The scale or units by which this measurement can be assessed can be any known, relevant scale/unit including, but not limited to, scales such as standard deviations, cumulative percentages, percentile equivalents, Z-scores, T-scores, standard nines, and percentages in standard nines. Similarly, the threshold by which the level of statistical significance is measured/assessed can be set and selected as desired. By one approach the threshold is static such that the same threshold is employed regardless of the circumstances. By another approach the threshold is dynamic and can vary with such things as the relative size of the population of people upon which each of the characterizations 508 are based and/or the amount of data and/or the duration of time over which data is available for the monitored person.

Figure 7:
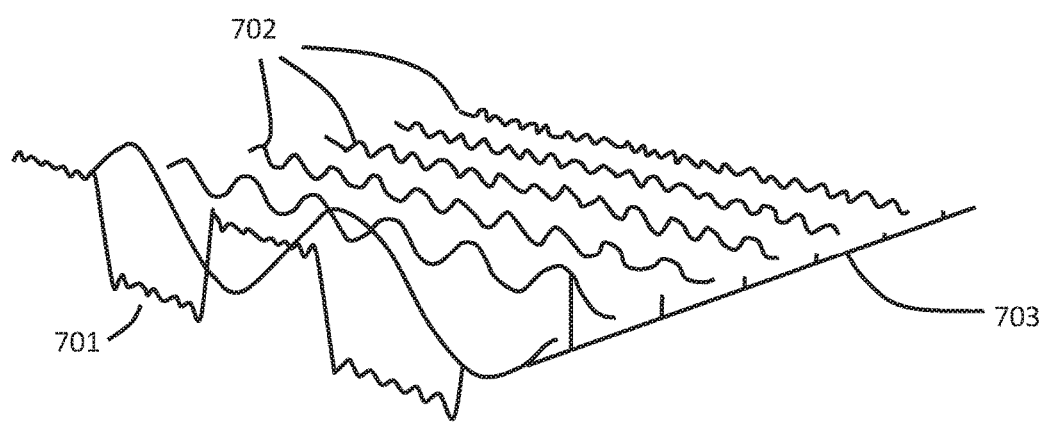
FIG. 7 comprises a graphic representation as configured in accordance with various embodiments of these teachings.

Referring now to FIG. 7, by one approach the selected characterization (denoted by reference numeral 701 in this figure) comprises an activity profile over time of one or more human behaviors. Examples of behaviors include but are not limited to such things as repeated purchases over time of particular commodities, repeated visits over time to particular locales such as certain restaurants, retail outlets, athletic or entertainment facilities, and so forth, and repeated activities over time such as floor cleaning, dish washing, car cleaning, cooking, volunteering, and so forth. Those skilled in the art will understand and appreciate, however, that the selected characterization is not, in and of itself, demographic data (as described elsewhere herein).

More particularly, the characterization 701 can represent (in this example, for a plurality of different behaviors) each instance over the monitored/sampled period of time when the monitored/represented person engages in a particular represented behavior (such as visiting a neighborhood gym, purchasing a particular product (such as a consumable perishable or a cleaning product), interacts with a particular affinity group via social networking, and so forth). The relevant overall time frame can be chosen as desired and can range in a typical application setting from a few hours or one day to many days, weeks, or even months or years. (It will be understood by those skilled in the art that the particular characterization shown in FIG. 7 is intended to serve an illustrative purpose and does not necessarily represent or mimic any particular behavior or set of behaviors).

Generally speaking it is anticipated that many behaviors of interest will occur at regular or somewhat regular intervals and hence will have a corresponding frequency or periodicity of occurrence. For some behaviors that frequency of occurrence may be relatively often (for example, oral hygiene events that occur at least once, and often multiple times each day) while other behaviors (such as the preparation of a holiday meal) may occur much less frequently (such as only once, or only a few times, each year). For at least some behaviors of interest that general (or specific) frequency of occurrence can serve as a significant indication of a person's corresponding partialities.

By one approach, these teachings will accommodate detecting and timestamping each and every event/activity/behavior or interest as it happens. Such an approach can be memory intensive and require considerable supporting infrastructure.

The present teachings will also accommodate, however, using any of a variety of sampling periods in these regards. In some cases, for example, the sampling period per se may be one week in duration. In that case, it may be sufficient to know that the monitored person engaged in a particular activity (such as cleaning their car) a certain number of times during that week without known precisely when, during that week, the activity occurred. In other cases it may be appropriate or even desirable, to provide greater granularity in these regards. For example, it may be better to know which days the person engaged in the particular activity or even the particular hour of the day. Depending upon the selected granularity/resolution, selecting an appropriate sampling window can help reduce data storage requirements (and/or corresponding analysis/processing overhead requirements).

Although a given person's behaviors may not, strictly speaking, be continuous waves (as shown in FIG. 7) in the same sense as, for example, a radio or acoustic wave, it will nevertheless be understood that such a behavioral characterization 701 can itself be broken down into a plurality of sub-waves 702 that, when summed together, equal or at least approximate to some satisfactory degree the behavioral characterization 701 itself (The more-discrete and sometimes less-rigidly periodic nature of the monitored behaviors may introduce a certain amount of error into the corresponding sub-waves. There are various mathematically satisfactory ways by which such error can be accommodated including by use of weighting factors and/or expressed tolerances that correspond to the resultant sub-waves.)

It should also be understood that each such sub-wave can often itself be associated with one or more corresponding discrete partialities. For example, a partiality reflecting concern for the environment may, in turn, influence many of the included behavioral events (whether they are similar or dissimilar behaviors or not) and accordingly may, as a sub-wave, comprise a relatively significant contributing factor to the overall set of behaviors as monitored over time. These sub-waves (partialities) can in turn be clearly revealed and presented by employing a transform (such as a Fourier transform) of choice to yield a spectral profile 703 wherein the X axis represents frequency and the Y axis represents the magnitude of the response of the monitored person at each frequency/sub-wave of interest.

Figure 8:
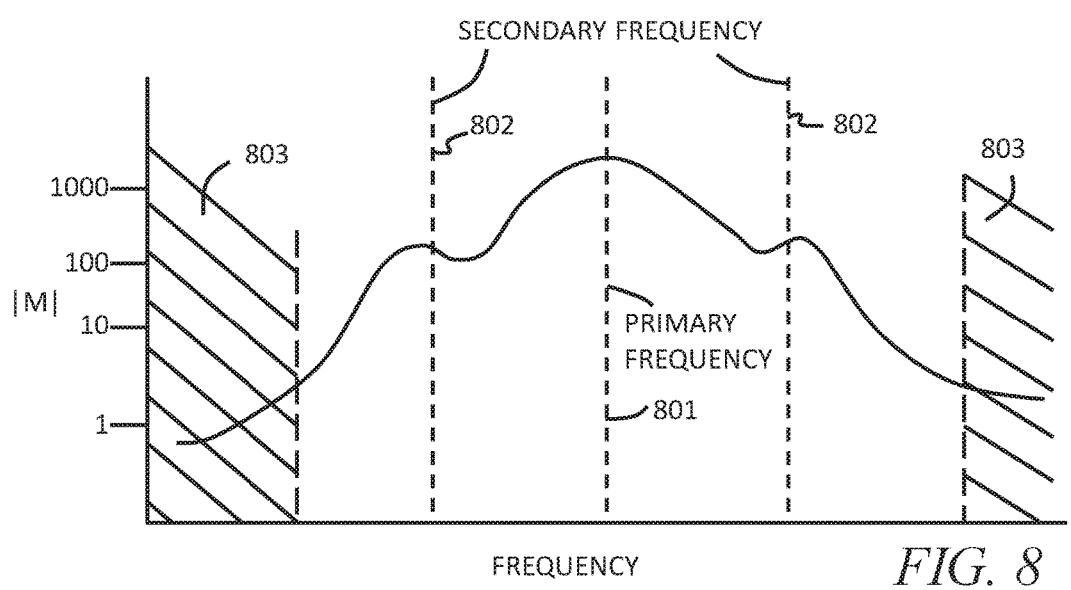
FIG. 8 comprises a graphic representation as configured in accordance with various embodiments of these teachings.

This spectral response of a given individual—which is generated from a time series of events that reflect/track that person's behavior—yields frequency response characteristics for that person that are analogous to the frequency response characteristics of physical systems such as, for example, an analog or digital filter or a second order electrical or mechanical system. Referring to FIG. 8, for many people the spectral profile of the individual person will exhibit a primary frequency 801 for which the greatest response (perhaps many orders of magnitude greater than other evident frequencies) to life is exhibited and apparent. In addition, the spectral profile may also possibly identify one or more secondary frequencies 802 above and/or below that primary frequency 801. (It may be useful in many application settings to filter out more distant frequencies 803 having considerably lower magnitudes because of a reduced likelihood of relevance and/or because of a possibility of error in those regards; in effect, these lower-magnitude signals constitute noise that such filtering can remove from consideration.)

As noted above, the present teachings will accommodate using sampling windows of varying size. By one approach the frequency of events that correspond to a particular partiality can serve as a basis for selecting a particular sampling rate to use when monitoring for such events. For example, Nyquist-based sampling rules (which dictate sampling at a rate at least twice that of the frequency of the signal of interest) can lead one to choose a particular sampling rate (and the resultant corresponding sampling window size).

As a simple illustration, if the activity of interest occurs only once a week, then using a sampling of half-a-week and sampling twice during the course of a given week will adequately capture the monitored event. If the monitored person's behavior should change, a corresponding change can be automatically made. For example, if the person in the foregoing example begins to engage in the specified activity three times a week, the sampling rate can be switched to six times per week (in conjunction with a sampling window that is resized accordingly).

By one approach, the sampling rate can be selected and used on a partiality-by-partiality basis. This approach can be especially useful when different monitoring modalities are employed to monitor events that correspond to different partialities. If desired, however, a single sampling rate can be employed and used for a plurality (or even all) partialities/behaviors. In that case, it can be useful to identify the behavior that is exemplified most often (i.e., that behavior which has the highest frequency) and then select a sampling rate that is at least twice that rate of behavioral realization, as that sampling rate will serve well and suffice for both that highest-frequency behavior and all lower-frequency behaviors as well.

It can be useful in many application settings to assume that the foregoing spectral profile of a given person is an inherent and inertial characteristic of that person and that this spectral profile, in essence, provides a personality profile of that person that reflects not only how but why this person responds to a variety of life experiences. More importantly, the partialities expressed by the spectral profile for a given person will tend to persist going forward and will not typically change significantly in the absence of some powerful external influence (including but not limited to significant life events such as, for example, marriage, children, loss of job, promotion, and so forth).

In any event, by knowing a priori the particular partialities (and corresponding strengths) that underlie the particular characterization 701, those partialities can be used as an initial template for a person whose own behaviors permit the selection of that particular characterization 701. In particular, those particularities can be used, at least initially, for a person for whom an amount of data is not otherwise available to construct a similarly rich set of partiality information.

As a very specific and non-limiting example, per these teachings the choice to make a particular product can include consideration of one or more value systems of potential customers. When considering persons who value animal rights, a product conceived to cater to that value proposition may require a corresponding exertion of additional effort to order material space-time such that the product is made in a way that (A) does not harm animals and/or (even better) (B) improves life for animals (for example, eggs obtained from free range chickens). The reason a person exerts effort to order material space-time is because they believe it is good to do and/or not good to not do so. When a person exerts effort to do good (per their personal standard of "good") and if that person believes that a particular order in material space-time (that includes the purchase of a particular product) is good to achieve, then that person will also believe that it is good to buy as much of that particular product (in order to achieve that good order) as their finances and needs reasonably permit (all other things being equal).

The aforementioned additional effort to provide such a product can (typically) convert to a premium that adds to the price of that product. A customer who puts out extra effort in their life to value animal rights will typically be willing to pay that extra premium to cover that additional effort exerted by the company. By one approach a magnitude that corresponds to the additional effort exerted by the company can be added to the person's corresponding value vector because a product or service has worth to the extent that the product/service allows a person to order material space-time in accordance with their own personal value system while allowing that person to exert less of their own effort in direct support of that value (since money is a scalar form of effort).

By one approach there can be hundreds or even thousands of identified partialities. In this case, if desired, each product/service of interest can be assessed with respect to each and every one of these partialities and a corresponding partiality vector formed to thereby build a collection of partiality vectors that collectively characterize the product/service. As a very simple example in these regards, a given laundry detergent might have a cleanliness partiality vector with a relatively high magnitude (representing the effectiveness of the detergent), a ecology partiality vector that might be relatively low or possibly even having a negative magnitude (representing an ecologically disadvantageous effect of the detergent post usage due to increased disorder in the environment), and a simple-life partiality vector with only a modest magnitude (representing the relative ease of use of the detergent but also that the detergent presupposes that the user has a modern washing machine). Other partiality vectors for this detergent, representing such things as nutrition or mental acuity, might have magnitudes of zero.

As mentioned above, these teachings can accommodate partiality vectors having a negative magnitude. Consider, for example, a partiality vector representing a desire to order things to reduce one's so-called carbon footprint. A magnitude of zero for this vector would indicate a completely neutral effect with respect to carbon emissions while any positive-valued magnitudes would represent a net reduction in the amount of carbon in the atmosphere, hence increasing the ability of the environment to be ordered. Negative magnitudes would represent the introduction of carbon emissions that increases disorder of the environment (for example, as a result of manufacturing the product, transporting the product, and/or using the product)

Figure 9:
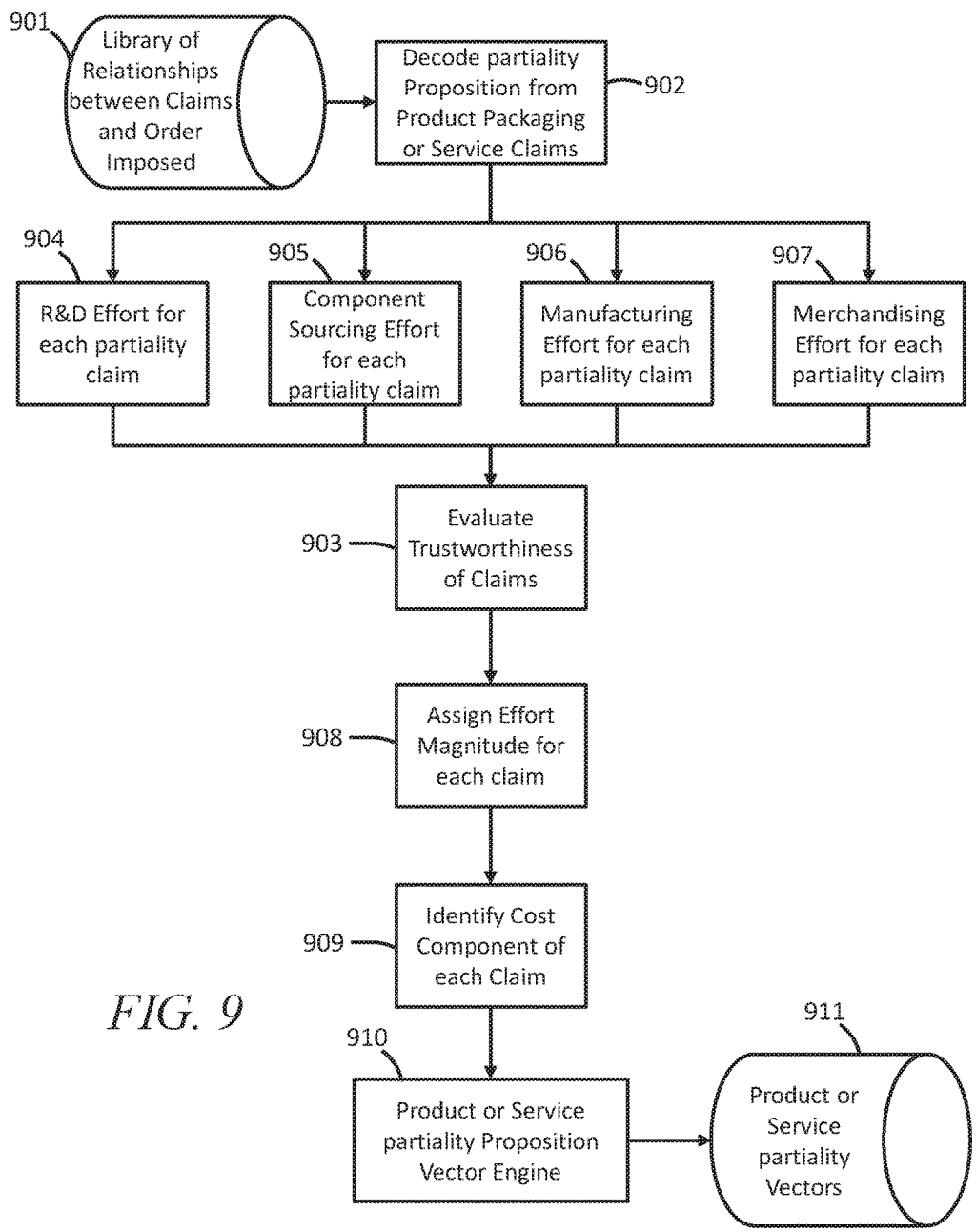
FIG. 9 comprises a flow diagram as configured in accordance with various embodiments of these teachings.

FIG. 9 presents one non-limiting illustrative example in these regards. The illustrated process presumes the availability of a library 901 of correlated relationships between product/service claims and particular imposed orders. Examples of product/service claims include such things as claims that a particular product results in cleaner laundry or household surfaces, or that a particular product is made in a particular political region (such as a particular state or country), or that a particular product is better for the environment, and so forth. The imposed orders to which such claims are correlated can reflect orders as described above that pertain to corresponding partialities.

At block 902 this process provides for decoding one or more partiality propositions from specific product packaging (or service claims). For example, the particular textual/graphics-based claims presented on the packaging of a given product can be used to access the aforementioned library 901 to identify one or more corresponding imposed orders from which one or more corresponding partialities can then be identified.

At block 903 this process provides for evaluating the trustworthiness of the aforementioned claims. This evaluation can be based upon any one or more of a variety of data points as desired. FIG. 9 illustrates four significant possibilities in these regards. For example, at block 904 an actual or estimated research and development effort can be quantified for each claim pertaining to a partiality. At block 905 an actual or estimated component sourcing effort for the product in question can be quantified for each claim pertaining to a partiality. At block 906 an actual or estimated manufacturing effort for the product in question can be quantified for each claim pertaining to a partiality. And at block 907 an actual or estimated merchandising effort for the product in question can be quantified for each claim pertaining to a partiality.

If desired, a product claim lacking sufficient trustworthiness may simply be excluded from further consideration. By another approach the product claim can remain in play but a lack of trustworthiness can be reflected, for example, in a corresponding partiality vector direction or magnitude for this particular product.

At block 908 this process provides for assigning an effort magnitude for each evaluated product/service claim. That effort can constitute a one-dimensional effort (reflecting, for example, only the manufacturing effort) or can constitute a multidimensional effort that reflects, for example, various categories of effort such as the aforementioned research and development effort, component sourcing effort, manufacturing effort, and so forth.

At block 909 this process provides for identifying a cost component of each claim, this cost component representing a monetary value. At block 910 this process can use the foregoing information with a product/service partiality propositions vector engine to generate a library 911 of one or more corresponding partiality vectors for the processed products/services. Such a library can then be used as described herein in conjunction with partiality vector information for various persons to identify, for example, products/services that are well aligned with the partialities of specific individuals.

Figure 10:
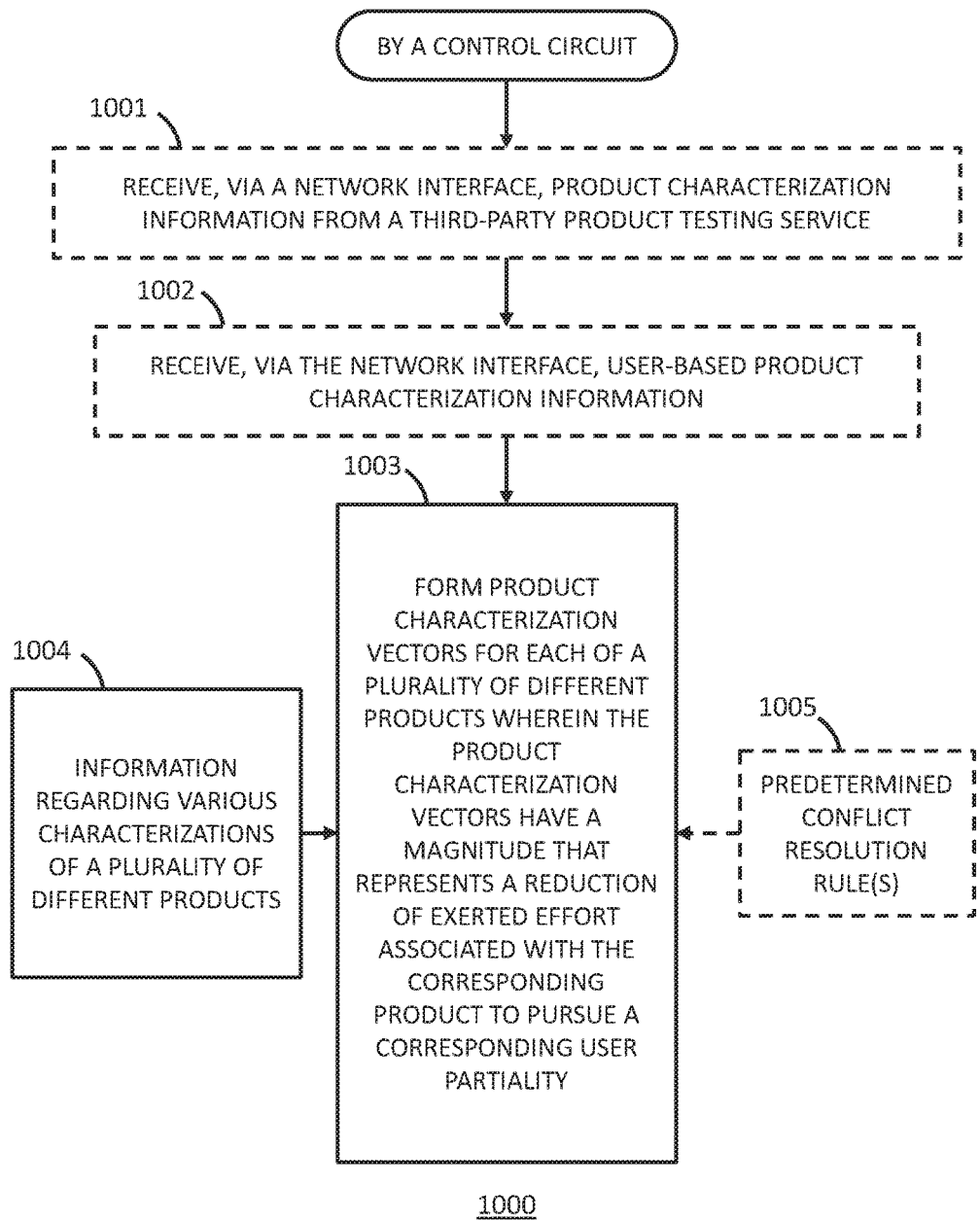
FIG. 10 comprises a flow diagram as configured in accordance with various embodiments of these teachings.

FIG. 10 provides another illustrative example in these same regards and may be employed in lieu of the foregoing or in total or partial combination therewith. Generally speaking, this process 1000 serves to facilitate the formation of product characterization vectors for each of a plurality of different products where the magnitude of the vector length (and/or the vector angle) has a magnitude that represents a reduction of exerted effort associated with the corresponding product to pursue a corresponding user partiality.

By one approach, and as illustrated in FIG. 10, this process 1000 can be carried out by a control circuit of choice. Specific examples of control circuits are provided elsewhere herein.

As described further herein in detail, this process 1000 makes use of information regarding various characterizations of a plurality of different products. These teachings are highly flexible in practice and will accommodate a wide variety of possible information sources and types of information. By one optional approach, and as shown at optional block 1001, the control circuit can receive (for example, via a corresponding network interface of choice) product characterization information from a third-party product testing service. The magazine/web resource Consumers Report provides one useful example in these regards. Such a resource provides objective content based upon testing, evaluation, and comparisons (and sometimes also provides subjective content regarding such things as aesthetics, ease of use, and so forth) and this content, provided as-is or pre-processed as desired, can readily serve as useful third-party product testing service product characterization information.

As another example, any of a variety of product-testing blogs that are published on the Internet can be similarly accessed and the product characterization information available at such resources harvested and received by the control circuit. (The expression "third party" will be understood to refer to an entity other than the entity that operates/controls the control circuit and other than the entity that provides the corresponding product itself.)

As another example, and as illustrated at optional block 1002, the control circuit can receive (again, for example, via a network interface of choice) user-based product characterization information. Examples in these regards include but are not limited to user reviews provided on-line at various retail sites for products offered for sale at such sites. The reviews can comprise metricized content (for example, a rating expressed as a certain number of stars out of a total available number of stars, such as 3 stars out of 5 possible stars) and/or text where the reviewers can enter their objective and subjective information regarding their observations and experiences with the reviewed products. In this case, "user-based" will be understood to refer to users who are not necessarily professional reviewers (though it is possible that content from such persons may be included with the information provided at such a resource) but who presumably purchased the product being reviewed and who have personal experience with that product that forms the basis of their review. By one approach the resource that offers such content may constitute a third party as defined above, but these teachings will also accommodate obtaining such content from a resource operated or sponsored by the enterprise that controls/operates this control circuit.

In any event, this process 1000 provides for accessing (see block 1004) information regarding various characterizations of each of a plurality of different products. This information 1004 can be gleaned as described above and/or can be obtained and/or developed using other resources as desired. As one illustrative example in these regards, the manufacturer and/or distributor of certain products may source useful content in these regards.

These teachings will accommodate a wide variety of information sources and types including both objective characterizing and/or subjective characterizing information for the aforementioned products.

Examples of objective characterizing information include, but are not limited to, ingredients information (i.e., specific components/materials from which the product is made), manufacturing locale information (such as country of origin, state of origin, municipality of origin, region of origin, and so forth), efficacy information (such as metrics regarding the relative effectiveness of the product to achieve a particular end-use result), cost information (such as per product, per ounce, per application or use, and so forth), availability information (such as present in-store availability, on-hand inventory availability at a relevant distribution center, likely or estimated shipping date, and so forth), environmental impact information (regarding, for example, the materials from which the product is made, one or more manufacturing processes by which the product is made, environmental impact associated with use of the product, and so forth), and so forth.

Examples of subjective characterizing information include but are not limited to user sensory perception information (regarding, for example, heaviness or lightness, speed of use, effort associated with use, smell, and so forth), aesthetics information (regarding, for example, how attractive or unattractive the product is in appearance, how well the product matches or accords with a particular design paradigm or theme, and so forth), trustworthiness information (regarding, for example, user perceptions regarding how likely the product is perceived to accomplish a particular purpose or to avoid causing a particular collateral harm), trendiness information, and so forth.

This information 1004 can be curated (or not), filtered, sorted, weighted (in accordance with a relative degree of trust, for example, accorded to a particular source of particular information), and otherwise categorized and utilized as desired. As one simple example in these regards, for some products it may be desirable to only use relatively fresh information (i.e., information not older than some specific cut-off date) while for other products it may be acceptable (or even desirable) to use, in lieu of fresh information or in combination therewith, relatively older information. As another simple example, it may be useful to use only information from one particular geographic region to characterize a particular product and to therefore not use information from other geographic regions.

At block 1003 the control circuit uses the foregoing information 1004 to form product characterization vectors for each of the plurality of different products. By one approach these product characterization vectors have a magnitude (for the length of the vector and/or the angle of the vector) that represents a reduction of exerted effort associated with the corresponding product to pursue a corresponding user partiality (as is otherwise discussed herein).

It is possible that a conflict will become evident as between various ones of the aforementioned items of information 1004. In particular, the available characterizations for a given product may not all be the same or otherwise in accord with one another. In some cases it may be appropriate to literally or effectively calculate and use an average to accommodate such a conflict. In other cases it may be useful to use one or more other predetermined conflict resolution rules 1005 to automatically resolve such conflicts when forming the aforementioned product characterization vectors.

These teachings will accommodate any of a variety of rules in these regards. By one approach, for example, the rule can be based upon the age of the information (where, for example the older (or newer, if desired) data is preferred or weighted more heavily than the newer (or older, if desired) data. By another approach, the rule can be based upon a number of user reviews upon which the user-based product characterization information is based (where, for example, the rule specifies that whichever user-based product characterization information is based upon a larger number of user reviews will prevail in the event of a conflict). By another approach, the rule can be based upon information regarding historical accuracy of information from a particular information source (where, for example, the rule specifies that information from a source with a better historical record of accuracy shall prevail over information from a source with a poorer historical record of accuracy in the event of a conflict).

By yet another approach, the rule can be based upon social media. For example, social media-posted reviews may be used as a tie-breaker in the event of a conflict between other more-favored sources. By another approach, the rule can be based upon a trending analysis. And by yet another approach the rule can be based upon the relative strength of brand awareness for the product at issue (where, for example, the rule specifies resolving a conflict in favor of a more favorable characterization when dealing with a product from a strong brand that evidences considerable consumer goodwill and trust).

It will be understood that the foregoing examples are intended to serve an illustrative purpose and are not offered as an exhaustive listing in these regards. It will also be understood that any two or more of the foregoing rules can be used in combination with one another to resolve the aforementioned conflicts.

By one approach the aforementioned product characterization vectors are formed to serve as a universal characterization of a given product. By another approach, however, the aforementioned information 1004 can be used to form product characterization vectors for a same characterization factor for a same product to thereby correspond to different usage circumstances of that same product. Those different usage circumstances might comprise, for example, different geographic regions of usage, different levels of user expertise (where, for example, a skilled, professional user might have different needs and expectations for the product than a casual, lay user), different levels of expected use, and so forth. In particular, the different vectorized results for a same characterization factor for a same product may have differing magnitudes from one another to correspond to different amounts of reduction of the exerted effort associated with that product under the different usage circumstances.

Figure 11:
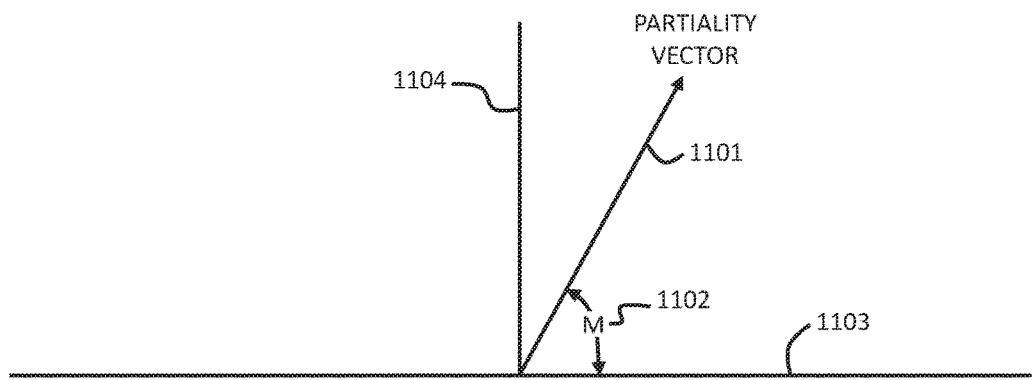
FIG. 11 comprises a graphic representation as configured in accordance with various embodiments of these teachings.

As noted above, the magnitude corresponding to a particular partiality vector for a particular person can be expressed by the angle of that partiality vector. FIG. 11 provides an illustrative example in these regards. In this example the partiality vector 1101 has an angle M 1102 (and where the range of available positive magnitudes range from a minimal magnitude represented by 0° (as denoted by reference numeral 1103) to a maximum magnitude represented by 90° (as denoted by reference numeral 1104)). Accordingly, the person to whom this partiality vector 1001 pertains has a relatively strong (but not absolute) belief in an amount of good that comes from an order associated with that partiality.

Figure 12:
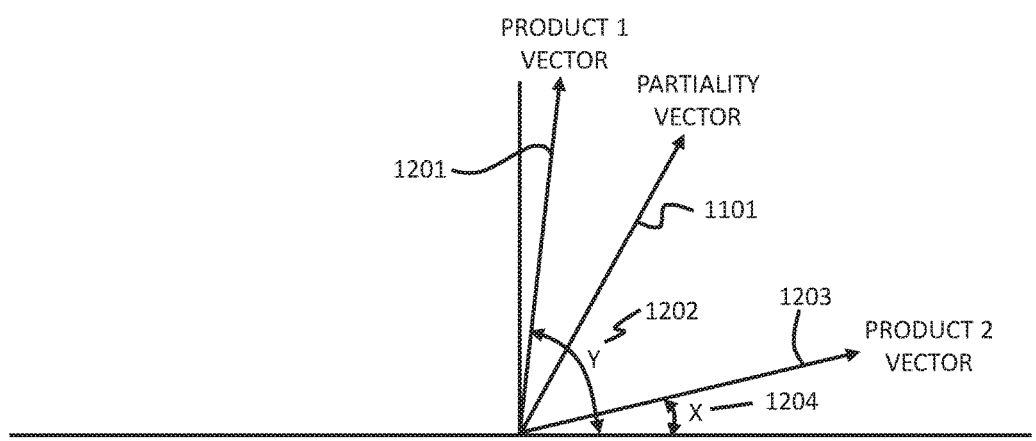
FIG. 12 comprises a graphic representation as configured in accordance with various embodiments of these teachings.

FIG. 12, in turn, presents that partiality vector 1101 in context with the product characterization vectors 1201 and 1203 for a first product and a second product, respectively. In this example the product characterization vector 1201 for the first product has an angle Y 1202 that is greater than the angle M 1102 for the aforementioned partiality vector 1101 by a relatively small amount while the product characterization vector 1203 for the second product has an angle X 1204 that is considerably smaller than the angle M 1102 for the partiality vector 1101.

Since, in this example, the angles of the various vectors represent the magnitude of the person's specified partiality or the extent to which the product aligns with that partiality, respectively, vector dot product calculations can serve to help identify which product best aligns with this partiality. Such an approach can be particularly useful when the lengths of the vectors are allowed to vary as a function of one or more parameters of interest. As those skilled in the art will understand, a vector dot product is an algebraic operation that takes two equal-length sequences of numbers (in this case, coordinate vectors) and returns a single number.

This operation can be defined either algebraically or geometrically. Algebraically, it is the sum of the products of the corresponding entries of the two sequences of numbers. Geometrically, it is the product of the Euclidean magnitudes of the two vectors and the cosine of the angle between them. The result is a scalar rather than a vector. As regards the present illustrative example, the resultant scaler value for the vector dot product of the product 1 vector 1201 with the partiality vector 1101 will be larger than the resultant scaler value for the vector dot product of the product 2 vector 1203 with the partiality vector 1101. Accordingly, when using vector angles to impart this magnitude information, the vector dot product operation provides a simple and convenient way to determine proximity between a particular partiality and the performance/properties of a particular product to thereby greatly facilitate identifying a best product amongst a plurality of candidate products.

By way of further illustration, consider an example where a particular consumer as a strong partiality for organic produce and is financially able to afford to pay to observe that partiality. A dot product result for that person with respect to a product characterization vector(s) for organic apples that represent a cost of $10 on a weekly basis (i.e., Cv·P1v) might equal (1,1), hence yielding a scalar result of $\|1\|$ (where Cv refers to the corresponding partiality vector for this person and P1v represents the corresponding product characterization vector for these organic apples). Conversely, a dot product result for this same person with respect to a product characterization vector(s) for non-organic apples that represent a cost of $5 on a weekly basis (i.e., Cv·P2v) might instead equal (1,0), hence yielding a scalar result of $\|½\|$. Accordingly, although the organic apples cost more than the non-organic apples, the dot product result for the organic apples exceeds the dot product result for the non-organic apples and therefore identifies the more expensive organic apples as being the best choice for this person.

To continue with the foregoing example, consider now what happens when this person subsequently experiences some financial misfortune (for example, they lose their job and have not yet found substitute employment). Such an event can present the "force" necessary to alter the previously-established "inertia" of this person's steady-state partialities; in particular, these negatively-changed financial circumstances (in this example) alter this person's budget sensitivities (though not, of course their partiality for organic produce as compared to non-organic produce). The scalar result of the dot product for the $5/week non-organic apples may remain the same (i.e., in this example, $\|½\|$), but the dot product for the $10/week organic apples may now drop (for example, to $\|½\|$ as well). Dropping the quantity of organic apples purchased, however, to reflect the tightened financial circumstances for this person may yield a better dot product result. For example, purchasing only $5 (per week) of organic apples may produce a dot product result of $\|1\|$. The best result for this person, then, under these circumstances, is a lesser quantity of organic apples rather than a larger quantity of non-organic apples.

In a typical application setting, it is possible that this person's loss of employment is not, in fact, known to the system. Instead, however, this person's change of behavior (i.e., reducing the quantity of the organic apples that are purchased each week) might well be tracked and processed to adjust one or more partialities (either through an addition or deletion of one or more partialities and/or by adjusting the corresponding partiality magnitude) to thereby yield this new result as a preferred result.

The foregoing simple examples clearly illustrate that vector dot product approaches can be a simple yet powerful way to quickly eliminate some product options while simultaneously quickly highlighting one or more product options as being especially suitable for a given person.

Such vector dot product calculations and results, in turn, help illustrate another point as well. As noted above, sine waves can serve as a potentially useful way to characterize and view partiality information for both people and products/services. In those regards, it is worth noting that a vector dot product result can be a positive, zero, or even negative value. That, in turn, suggests representing a particular solution as a normalization of the dot product value relative to the maximum possible value of the dot product. Approached this way, the maximum amplitude of a particular sine wave will typically represent a best solution.

Taking this approach further, by one approach the frequency (or, if desired, phase) of the sine wave solution can provide an indication of the sensitivity of the person to product choices (for example, a higher frequency can indicate a relatively highly reactive sensitivity while a lower frequency can indicate the opposite). A highly sensitive person is likely to be less receptive to solutions that are less than fully optimum and hence can help to narrow the field of candidate products while, conversely, a less sensitive person is likely to be more receptive to solutions that are less than fully optimum and can help to expand the field of candidate products.

Figure 13:
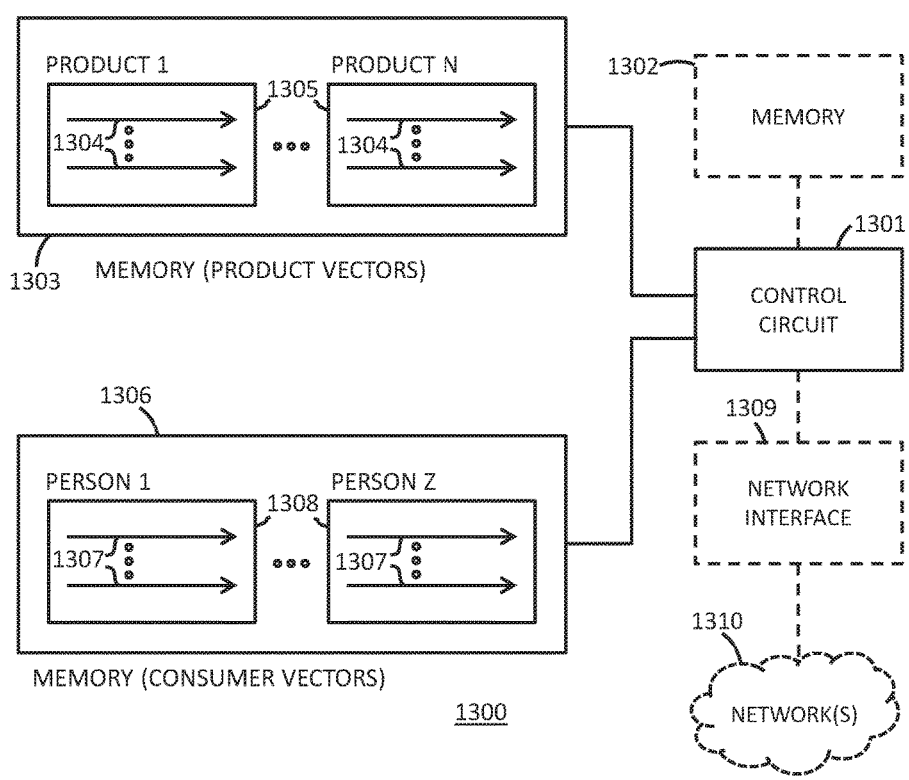
FIG. 13 comprises a block diagram as configured in accordance with various embodiments of these teachings.

FIG. 13 presents an illustrative apparatus 1300 for conducting, containing, and utilizing the foregoing content and capabilities. In this particular example, the enabling apparatus 1300 includes a control circuit 1301. Being a "circuit," the control circuit 1301 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1301 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1301 is configured (for example, by using corresponding programming as will be well understood by those skilled in the art) to carry out one or more of the steps, actions, and/or functions described herein.

By one optional approach the control circuit 1301 operably couples to a memory 1302. This memory 1302 may be integral to the control circuit 1301 or can be physically discrete (in whole or in part) from the control circuit 1301 as desired. This memory 1302 can also be local with respect to the control circuit 1301 (where, for example, both share a common circuit board, chassis, power supply, and/or housing) or can be partially or wholly remote with respect to the control circuit 1301 (where, for example, the memory 1302 is physically located in another facility, metropolitan area, or even country as compared to the control circuit 1301).

This memory 1302 can serve, for example, to non-transitorily store the computer instructions that, when executed by the control circuit 1301, cause the control circuit 1301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Either stored in this memory 1302 or, as illustrated, in a separate memory 1303 are the vectorized characterizations 1304 for each of a plurality of products 1305 (represented here by a first product through an Nth product where "N" is an integer greater than "1"). In addition, and again either stored in this memory 1302 or, as illustrated, in a separate memory 1306 are the vectorized characterizations 1307 for each of a plurality of individual persons 1308 (represented here by a first person through a Zth person wherein "Z" is also an integer greater than "1").

In this example the control circuit 1301 also operably couples to a network interface 1309. So configured the control circuit 1301 can communicate with other elements (both within the apparatus 1300 and external thereto) via the network interface 1309. Network interfaces, including both wireless and non-wireless platforms, are well understood in the art and require no particular elaboration here. This network interface 1309 can compatibly communicate via whatever network or networks 1310 may be appropriate to suit the particular needs of a given application setting. Both communication networks and network interfaces are well understood areas of prior art endeavor and therefore no further elaboration will be provided here in those regards for the sake of brevity.

Figure 14:
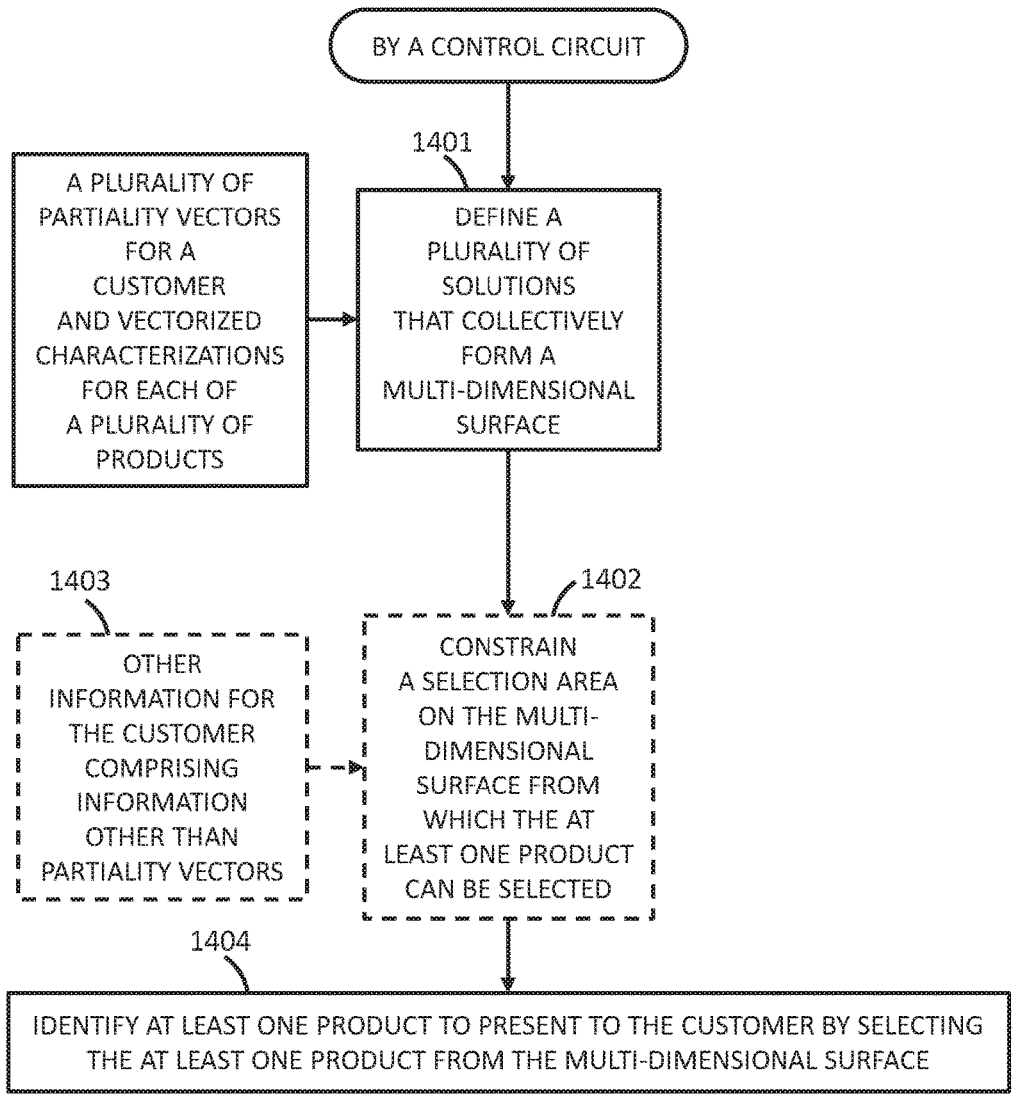
FIG. 14 comprises a flow diagram as configured in accordance with various embodiments of these teachings.
Figure 15:
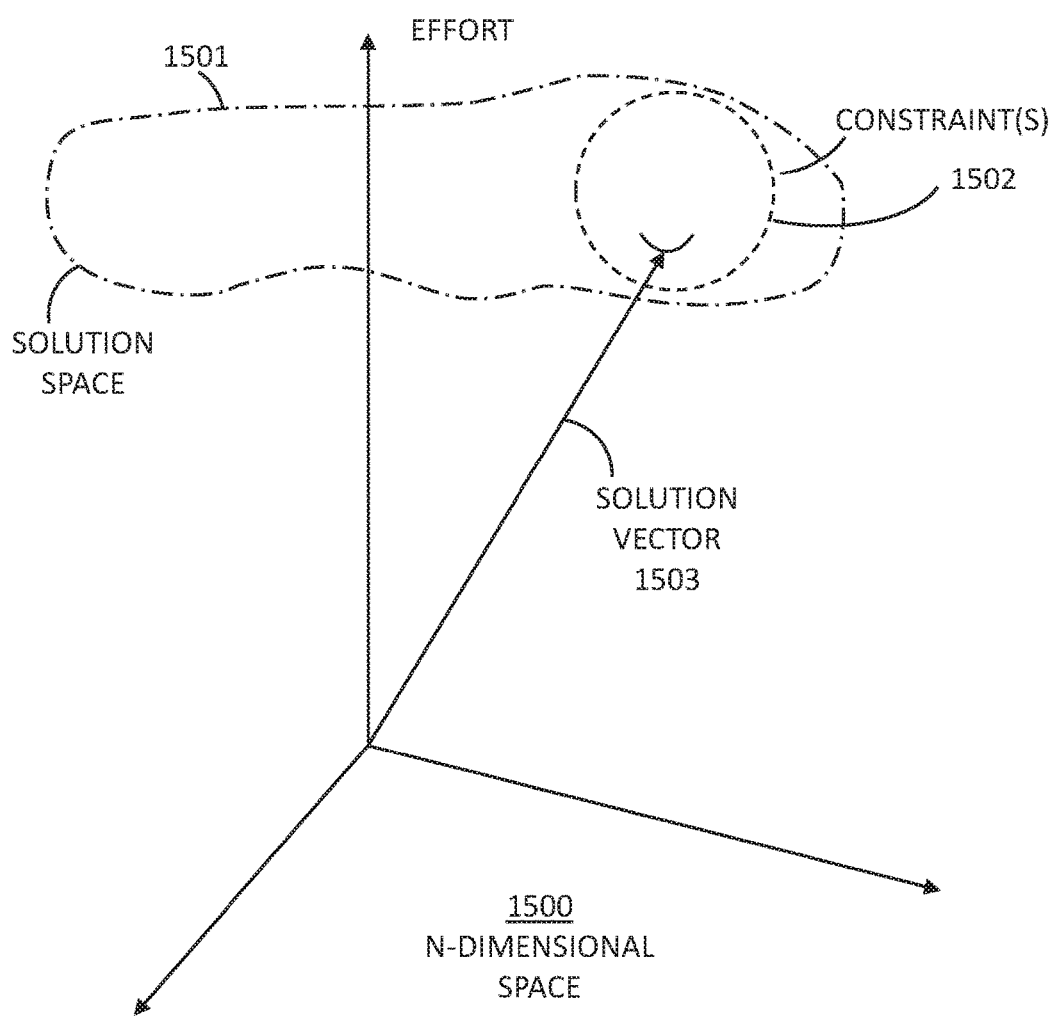
FIG. 15 comprises a graph as configured in accordance with various embodiments of these teachings.

By one approach, and referring now to FIG. 14, the control circuit 1301 is configured to use the aforementioned partiality vectors 1307 and the vectorized product characterizations 1304 to define a plurality of solutions that collectively form a multidimensional surface (per block 1401). FIG. 15 provides an illustrative example in these regards. FIG. 15 represents an N-dimensional space 1500 and where the aforementioned information for a particular customer yielded a multi-dimensional surface denoted by reference numeral 1501. (The relevant value space is an N-dimensional space where the belief in the value of a particular ordering of one's life only acts on value propositions in that space as a function of a least-effort functional relationship.)

Generally speaking, this surface 1501 represents all possible solutions based upon the foregoing information. Accordingly, in a typical application setting this surface 1501 will contain/represent a plurality of discrete solutions. That said, and also in a typical application setting, not all of those solutions will be similarly preferable. Instead, one or more of those solutions may be particularly useful/appropriate at a given time, in a given place, for a given customer.

With continued reference to FIGS. 14 and 15, at optional block 1402 the control circuit 1301 can be configured to use information for the customer 1403 (other than the aforementioned partiality vectors 1307) to constrain a selection area 1502 on the multi-dimensional surface 1501 from which at least one product can be selected for this particular customer. By one approach, for example, the constraints can be selected such that the resultant selection area 1502 represents the best 95th percentile of the solution space. Other target sizes for the selection area 1502 are of course possible and may be useful in a given application setting.

The aforementioned other information 1403 can comprise any of a variety of information types. By one approach, for example, this other information comprises objective information. (As used herein, "objective information" will be understood to constitute information that is not influenced by personal feelings or opinions and hence constitutes unbiased, neutral facts.)

One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the selection area 1502), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

At block 1404 the control circuit 1301 can then identify at least one product to present to the customer by selecting that product from the multi-dimensional surface 1501. In the example of FIG. 15, where constraints have been used to define a reduced selection area 1502, the control circuit 1301 is constrained to select that product from within that selection area 1502. For example, and in accordance with the description provided herein, the control circuit 1301 can select that product via solution vector 1503 by identifying a particular product that requires a minimal expenditure of customer effort while also remaining compliant with one or more of the applied objective constraints based, for example, upon objective information regarding the customer and/or objective logistical information regarding providing particular products to the customer.

So configured, and as a simple example, the control circuit 1301 may respond per these teachings to learning that the customer is planning a party that will include seven other invited individuals. The control circuit 1301 may therefore be looking to identify one or more particular beverages to present to the customer for consideration in those regards. The aforementioned partiality vectors 1307 and vectorized product characterizations 1304 can serve to define a corresponding multi-dimensional surface 1501 that identifies various beverages that might be suitable to consider in these regards.

Objective information regarding the customer and/or the other invited persons, however, might indicate that all or most of the participants are not of legal drinking age. In that case, that objective information may be utilized to constrain the available selection area 1502 to beverages that contain no alcohol. As another example in these regards, the control circuit 1301 may have objective information that the party is to be held in a state park that prohibits alcohol and may therefore similarly constrain the available selection area 1502 to beverages that contain no alcohol.

Figure 16:
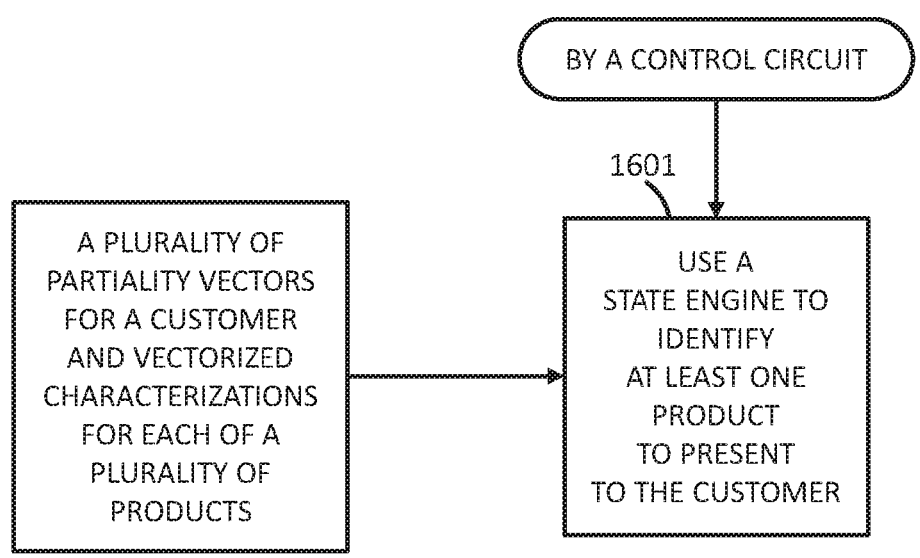
FIG. 16 comprises a flow diagram as configured in accordance with various embodiments of these teachings.

As described above, the aforementioned control circuit 1301 can utilize information including a plurality of partiality vectors for a particular customer along with vectorized product characterizations for each of a plurality of products to identify at least one product to present to a customer. By one approach 1600, and referring to FIG. 16, the control circuit 1301 can be configured as (or to use) a state engine to identify such a product (as indicated at block 1601). As used herein, the expression "state engine" will be understood to refer to a finite-state machine, also sometimes known as a finite-state automaton or simply as a state machine.

Generally speaking, a state engine is a basic approach to designing both computer programs and sequential logic circuits. A state engine has only a finite number of states and can only be in one state at a time. A state engine can change from one state to another when initiated by a triggering event or condition often referred to as a transition. Accordingly, a particular state engine is defined by a list of its states, its initial state, and the triggering condition for each transition.

Figure 17:
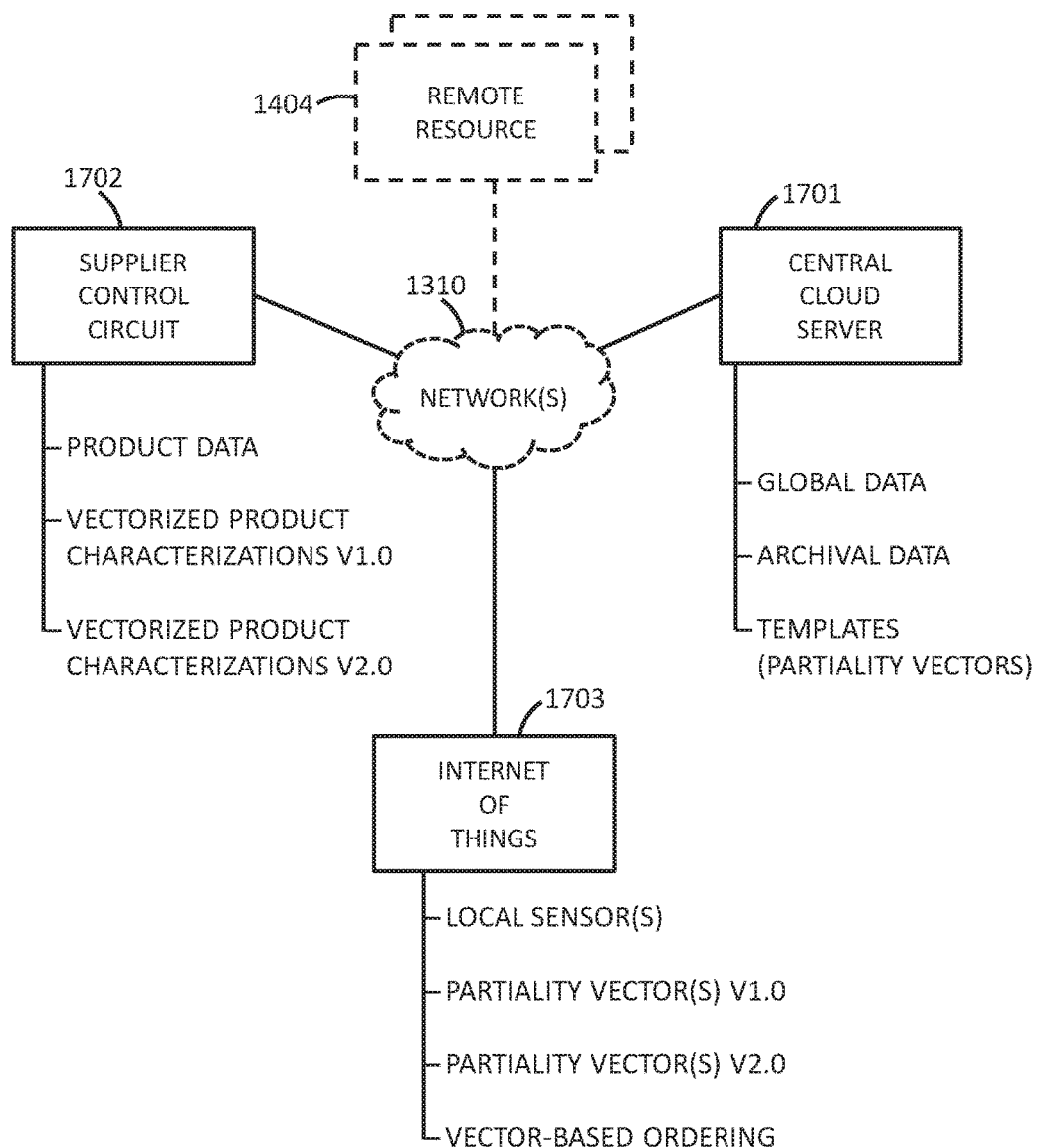
FIG. 17 comprises a block diagram as configured in accordance with various embodiments of these teachings.

It will be appreciated that the apparatus 1300 described above can be viewed as a literal physical architecture or, if desired, as a logical construct. For example, these teachings can be enabled and operated in a highly centralized manner (as might be suggested when viewing that apparatus 1300 as a physical construct) or, conversely, can be enabled and operated in a highly decentralized manner. FIG. 17 provides an example as regards the latter.

In this illustrative example a central cloud server 1701, a supplier control circuit 1702, and the aforementioned Internet of Things 1703 communicate via the aforementioned network 1310.

The central cloud server 1701 can receive, store, and/or provide various kinds of global data (including, for example, general demographic information regarding people and places, profile information for individuals, product descriptions and reviews, and so forth), various kinds of archival data (including, for example, historical information regarding the aforementioned demographic and profile information and/or product descriptions and reviews), and partiality vector templates as described herein that can serve as starting point general characterizations for particular individuals as regards their partialities. Such information may constitute a public resource and/or a privately-curated and accessed resource as desired. (It will also be understood that there may be more than one such central cloud server 1701 that store identical, overlapping, or wholly distinct content.)

The supplier control circuit 1702 can comprise a resource that is owned and/or operated on behalf of the suppliers of one or more products (including but not limited to manufacturers, wholesalers, retailers, and even resellers of previously-owned products). This resource can receive, process and/or analyze, store, and/or provide various kinds of information. Examples include but are not limited to product data such as marketing and packaging content (including textual materials, still images, and audio-video content), operators and installers manuals, recall information, professional and non-professional reviews, and so forth.

Another example comprises vectorized product characterizations as described herein. More particularly, the stored and/or available information can include both prior vectorized product characterizations (denoted in FIG. 17 by the expression "vectorized product characterizations V1.0") for a given product as well as subsequent, updated vectorized product characterizations (denoted in FIG. 17 by the expression "vectorized product characterizations V2.0") for the same product. Such modifications may have been made by the supplier control circuit 1702 itself or may have been made in conjunction with or wholly by an external resource as desired.

The Internet of Things 1703 can comprise any of a variety of devices and components that may include local sensors that can provide information regarding a corresponding user's circumstances, behaviors, and reactions back to, for example, the aforementioned central cloud server 1701 and the supplier control circuit 1702 to facilitate the development of corresponding partiality vectors for that corresponding user. Again, however, these teachings will also support a decentralized approach. In many cases devices that are fairly considered to be members of the Internet of Things 1703 constitute network edge elements (i.e., network elements deployed at the edge of a network). In some case the network edge element is configured to be personally carried by the person when operating in a deployed state. Examples include but are not limited to so-called smart phones, smart watches, fitness monitors that are worn on the body, and so forth. In other cases, the network edge element may be configured to not be personally carried by the person when operating in a deployed state. This can occur when, for example, the network edge element is too large and/or too heavy to be reasonably carried by an ordinary average person. This can also occur when, for example, the network edge element has operating requirements ill-suited to the mobile environment that typifies the average person.

For example, a so-called smart phone can itself include a suite of partiality vectors for a corresponding user (i.e., a person that is associated with the smart phone which itself serves as a network edge element) and employ those partiality vectors to facilitate vector-based ordering (either automated or to supplement the ordering being undertaken by the user) as is otherwise described herein. In that case, the smart phone can obtain corresponding vectorized product characterizations from a remote resource such as, for example, the aforementioned supplier control circuit 1702 and use that information in conjunction with local partiality vector information to facilitate the vector-based ordering.

Also, if desired, the smart phone in this example can itself modify and update partiality vectors for the corresponding user. To illustrate this idea in FIG. 17, this device can utilize, for example, information gained at least in part from local sensors to update a locally-stored partiality vector (represented in FIG. 17 by the expression "partiality vector V1.0") to obtain an updated locally-stored partiality vector (represented in FIG. 17 by the expression "partiality vector V2.0"). Using this approach, a user's partiality vectors can be locally stored and utilized. Such an approach may better comport with a particular user's privacy concerns.

It will be understood that the smart phone employed in the immediate example is intended to serve in an illustrative capacity and is not intended to suggest any particular limitations in these regards. In fact, any of a wide variety of Internet of Things devices/components could be readily configured in the same regards. As one simple example in these regards, a computationally-capable networked refrigerator could be configured to order appropriate perishable items for a corresponding user as a function of that user's partialities.

Presuming a decentralized approach, these teachings will accommodate any of a variety of other remote resources 1704. These remote resources 1704 can, in turn, provide static or dynamic information and/or interaction opportunities or analytical capabilities that can be called upon by any of the above-described network elements. Examples include but are not limited to voice recognition, pattern and image recognition, facial recognition, statistical analysis, computational resources, encryption and decryption services, fraud and misrepresentation detection and prevention services, digital currency support, and so forth.

As already suggested above, these approaches provide powerful ways for identifying products and/or services that a given person, or a given group of persons, may likely wish to buy to the exclusion of other options. When the magnitude and direction of the relevant/required meta-force vector that comes from the perceived effort to impose order is known, these teachings will facilitate, for example, engineering a product or service containing potential energy in the precise ordering direction to provide a total reduction of effort. Since people generally take the path of least effort (consistent with their partialities) they will typically accept such a solution.

As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

As another simple example, the approaches described herein can be used to filter out products/services that are not likely to accord well with a given person's partiality vectors. In particular, rather than emphasizing one particular product over another, a given person can be presented with a group of products that are available to purchase where all of the vectors for the presented products align to at least some predetermined degree of alignment/accord and where products that do not meet this criterion are simply not presented.

And as yet another simple example, a particular person may have a strong partiality towards both cleanliness and orderliness. The strength of this partiality might be measured in part, for example, by the physical effort they exert by consistently and promptly cleaning their kitchen following meal preparation activities. If this person were looking for lawn care services, their partiality vector(s) in these regards could be used to identify lawn care services who make representations and/or who have a trustworthy reputation or record for doing a good job of cleaning up the debris that results when mowing a lawn. This person, in turn, will likely appreciate the reduced effort on their part required to locate such a service that can meaningfully contribute to their desired order.

These teachings can be leveraged in any number of other useful ways. As one example in these regards, various sensors and other inputs can serve to provide automatic updates regarding the events of a given person's day. By one approach, at least some of this information can serve to help inform the development of the aforementioned partiality vectors for such a person. At the same time, such information can help to build a view of a normal day for this particular person. That baseline information can then help detect when this person's day is going experientially awry (i.e., when their desired "order" is off track). Upon detecting such circumstances these teachings will accommodate employing the partiality and product vectors for such a person to help make suggestions (for example, for particular products or services) to help correct the day's order and/or to even effect automatically-engaged actions to correct the person's experienced order.

When this person's partiality (or relevant partialities) are based upon a particular aspiration, restoring (or otherwise contributing to) order to their situation could include, for example, identifying the order that would be needed for this person to achieve that aspiration. Upon detecting, (for example, based upon purchases, social media, or other relevant inputs) that this person is aspiring to be a gourmet chef, these teachings can provide for plotting a solution that would begin providing/offering additional products/services that would help this person move along a path of increasing how they order their lives towards being a gourmet chef.

By one approach, these teachings will accommodate presenting the consumer with choices that correspond to solutions that are intended and serve to test the true conviction of the consumer as to a particular aspiration. The reaction of the consumer to such test solutions can then further inform the system as to the confidence level that this consumer holds a particular aspiration with some genuine conviction. In particular, and as one example, that confidence can in turn influence the degree and/or direction of the consumer value vector(s) in the direction of that confirmed aspiration.

All the above approaches are informed by the constraints the value space places on individuals so that they follow the path of least perceived effort to order their lives to accord with their values which results in partialities. People generally order their lives consistently unless and until their belief system is acted upon by the force of a new trusted value proposition. The present teachings are uniquely able to identify, quantify, and leverage the many aspects that collectively inform and define such belief systems.

A person's preferences can emerge from a perception that a product or service removes effort to order their lives according to their values. The present teachings acknowledge and even leverage that it is possible to have a preference for a product or service that a person has never heard of before in that, as soon as the person perceives how it will make their lives easier they will prefer it. Most predictive analytics that use preferences are trying to predict a decision the customer is likely to make. The present teachings are directed to calculating a reduced effort solution that can/will inherently and innately be something to which the person is partial.

Customer service agents are associates who provide information and/or suggestions to customers in person or remotely. A customer agent's interaction with a customer affects a customer's overall experience with a retailer and the customer's purchase decisions.

In one embodiment, a system for providing customer service agent assistance comprises a customer profile database storing customer partiality vectors for a plurality of customers, the customer partiality vectors comprise customer value vectors, a communication device, and a control circuit coupled to the customer profile database and the communication device, the control circuit being configured to: provide a customer service agent user interface on a user device associated with a customer service agent, associate a particular customer with the customer service agent, retrieving at least one customer value vector for the particular customer from the customer profile database, and cause, via the communication device, the at least one customer value vector of the particular customer to be displayed on the customer service agent user interface of the user device.

Figure 18:
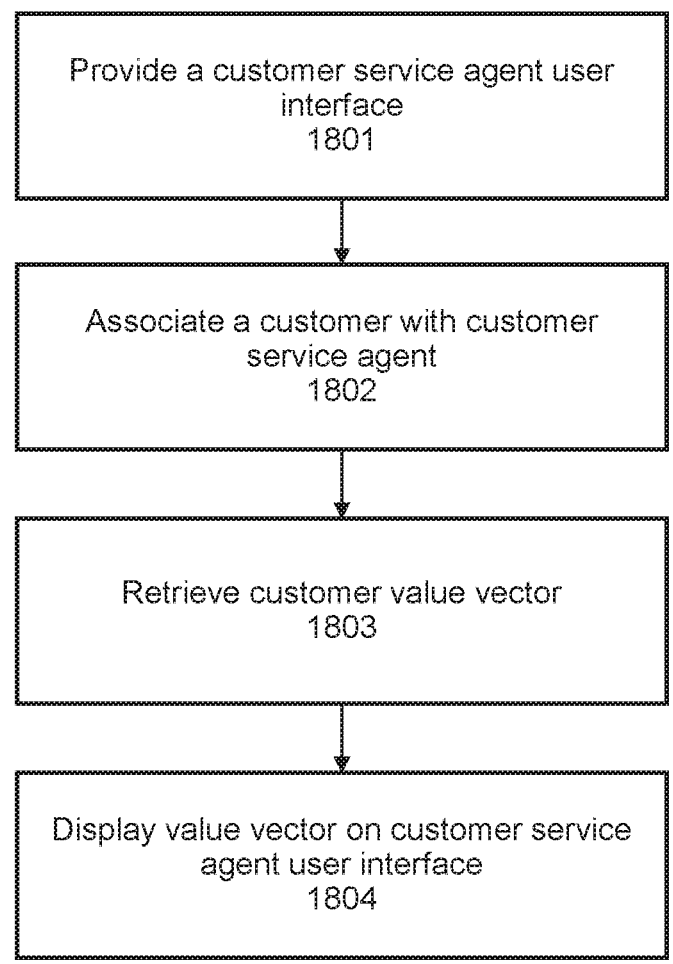
FIG. 18 comprise a flow diagram as configured in accordance with various embodiments of these teachings.

Referring next to FIG. 18, a method for providing customer service agent assistance according to some embodiments is shown. The steps in FIG. 18 may generally be performed by a processor-based device such as a central computer system, a server, a cloud-based server, a customer service agent system, a retail management system, etc. In some embodiments, the steps in FIG. 18 may be performed by one or more of the control circuit 1301 described with reference to FIG. 13, the control circuit 1911, and the customer service agent user device 1925 described with reference to FIG. 19 herein.

In step 1801, the system provides a customer service agent user interface to a user device associated with a customer service agent. In some embodiments, the user device associated with the customer service agent may comprise one or more of a desktop computer, a laptop computer, a mobile device, a portable device, a personal computer, a smartphone, a wearable device, a head-held device, a head mounted display (HMD), an augmented reality display, etc. The user device associated with the customer service agent may comprise a processor-based device that include one or more user input/output devices such as one or more of a display screen, a touch screen, a head mounted display, a microphone, a speaker, one or more buttons, a touch pad, a motion sensor, an eye tracker, a gesture sensor, etc. In some embodiments, the customer service agent user interface may comprise one or more of a mobile application, a computer program, an augmented reality display program, a web-based user interface and the like.

In step 1802, the system associates a customer with the customer service agent. In some embodiments, for in-person interactions, a customer service agent may ask for the customer's identifier (e.g. name, phone number, email, club card, etc.) and enter the customer's identifier into a customer service agent device to associate the customer with the customer service session. In some embodiments, for a customer service telephone call, the system may use the customer's caller ID and/or prompt the customer service agent ask for a customer identifier to associate the customer with the customer service session. In some embodiments, for an on-line customer service agent, the system may use the customer's website log-in information and/or prompt the customer service ask for a customer identifier to associate the customer with the customer service session. In some embodiments, for a customer service kiosk connecting an in-store customer to a remote customer service agent, the system prompt ask the customer to scan an ID (e.g. club card, discount card, bank card) or enter identifying information via the kiosk, and/or prompt the customer service agent to verbally ask for a customer identifier to associate the customer with the customer service session. Generally, a customer's identify may be obtain via various methods and associated with the customer service agent depending on the customer service session type without departing from the spirit of the present disclosure.

In some embodiments, the system may be configured to select a customer service agent for a customer. In some embodiments, the customer service agent may be selected for a customer by comparing the partiality vectors of the customer with a plurality of customer service agents. For example, when a customer requests customer service, a customer service agent may selected based on how well the partiality vectors of the customer service agent aligns with the partiality vectors of the customer. The partiality vector alignments between the customer and the customer service agent may be determined by adding, subtracting, multiplying, and/or dividing the magnitudes of the corresponding vectors in the customer and customer service agent partiality vectors. In some embodiments, scores for each vector may be added and/or averaged to determine an overall alignment score. In some embodiments, agents may be ranked and/or prioritized for a customer based on the degree of alignment between the partiality vectors of the customer service agent and the customer, and the system may use the ranking to select an agent for the customer. In some embodiments, the system may consider other factors in the selection of an agent, such as agent availability, wait time, agent knowledge, etc. In some embodiments, only a subset of partiality vectors may be compared in selecting a customer service agent for a customer. For example, the system may only determine the alignment of value vectors in the selection of a customer service agent.

In some embodiments, a customer may enter preferences (e.g. language, gender, department specialty) for agents when he/she requests customer service. In some embodiments, the customer may select a specific product for a customer service session and a customer service agent may be selected based on the selected product. For example, if a television set is selected, a customer service agent with knowledge of television technology may be selected.

In some embodiments, one or more customers may be associated with the customer service agent in step 1802. In some embodiments, one or more members of a group (e.g. household, office, social gathering, event, etc.) requesting customer service may have a customer profile associated with them. When a customer service agent is providing customer service to a group, each customer in the group having a customer profile may be associated with the customer service agent in step 1802.

In step 1803, the system retrieves customer value vectors associated with a customer. In some embodiments, the customer value vector may be retrieved from a customer profile database storing customer partiality vectors for a plurality of customers using one or more customer identifiers (e.g. customer name, customer ID, etc.). The customer may generally be a person requesting customer service. In some embodiments, the customer partiality vectors each represents at least one of a person's values, preferences, affinities, and aspirations. In some embodiments, customer value vectors each comprises a magnitude that corresponds to the customer's belief in good that comes from an order associated with that value. In some embodiments, the customer partiality vectors, including value vectors, may be determined and/or updated with the purchase and/or return history of associated with the customer. In some embodiments, if multiple customers are associated with the customer service agent, the system may retrieve customer value vectors associated with each customer associated in step 1803.

In step 1804, the system displays customer value vectors on the customer service agent user interface. In some embodiments, the customer value vectors may be provided to a user device associated with the customer service agent to display. In some embodiments, the customer service agent user interface may be configured to display one or more partialities associated with the customer and the vector magnitude associated with the partiality. In some embodiments, the customer value and/or partiality vectors may be presented with a graph such as one or more of a line graph, a bar graph, a radar chart, a circle graph, and the like. Generally, the customer service agent user interface may be configured to display the value vectors and/or other partiality vectors in any text and/or graphical format to convey the customer values and magnitudes of the values. In some embodiments, if multiple customers are associated with the customer service agent in step 1802, partiality vectors for one or more customer may be displayed on the customer service agent user interface. In some embodiments, if a plurality of customers comprise a group that shares a purchase, the system may be configured to average the magnitudes of a plurality of vectors and/or display the highest and/or lowest magnitudes associated for each partiality vector. In some embodiments, the user interface may select one or more partiality vectors among each the partiality vectors in the customer's profile to display. In some embodiments, the user interface may initially display customer partiality vectors with the highest magnitudes. In some embodiments, the display of the partiality vectors may be interactive. For example, a customer service agent may select different partiality vectors to view. In another example, a customer service agent may select an item category (e.g. produce, apparel, household supply, etc.) and the user interface may display partiality vectors determined to be more relevant to the selected item category.

In some embodiments, a customer may select one or more items for the customer service session. For example, if a customer has questions about a particular television set, the television set's product identifier (e.g. barcode, UPC, etc.) may be provided to the system prior or during the customer service session. In some embodiments, the system may select one or more vectorized product characterizations associated with the product identifier as relevant attributes based on the customer partiality vectors and cause the customer service agent user interface to display the relevant characterizations. For example, for a television set, partiality vectors associated with energy savings, simplicity, and advance technology may be displayed while vectors associated with organic products and cleanliness may be omitted.

In some embodiments, the system may further be configured to determine a vector alignment between an item selected by the customer and the user's partiality vectors, including value vectors. In some embodiments, the system may receive a product identifier via one or more of an in-store kiosk, a customer user device, and/or a customer service agent user device. For example, the product identifier may be received via one or more of a barcode, a Radio Frequency Identification (RFID) tag, a photograph, a product name, and a brand name. The system may then retrieve vectorized product characterizations associated with the product identifier from a product database and compare the customer partiality vectors and the vectorized product characterizations of the selected product. In some embodiments, the customer partiality vectors, including customer value vectors, and the vectorized product characterizations may be compared to determine a degree of alignment between the customer and one or more products. In some embodiments, the alignment between a product and a customer may be determined by adding, subtracting, multiplying, and/or dividing the magnitudes of the corresponding vectors in the customer partiality vectors and product characterization vectors. For example, an alignment score for each vector may be determined by subtracting the magnitude of the customer vector from the magnitude of the associated product characterization vector. In some embodiments, alignment between the customer and the product may be determined based on whether the scores of each vector exceeds a set score (e.g. 0, −1, etc.). In some embodiments, scores for each vector may be added and/or averaged to determine an overall alignment score. In some embodiments, compatibility between the customer and the product may further be determined based on whether the overall alignment score exceeds a threshold. In some embodiments, an item may be considered to be compatible with a customer if the alignment between the customer partiality vectors and the vectorized product characterizations exceeds a threshold. In some embodiments, the system may determine that a product is compatible with a customer only if each product characterization vector matches or exceeds the corresponding customer partiality vector. In some embodiments, products may be ranked and/or prioritized for the customer based on the degree of alignment between the customer partiality vectors and the product characterization vectors.

In some embodiments, the system may be select one or more vectorized product characterizations associated with the product identifier as relevant attributes based on the customer partiality vectors and cause the customer service agent user interface to display the relevant attributes/characteristics. In some embodiments, relevant attributes may correspond to product characterization vectors that have high alignment with customer partiality vectors. For example, if the customer's partiality vector and the product's associated with energy efficiency have a high alignment (e.g. both have a high magnitudes), the system may bring this alignment of vectors to the attention of the customer service agent. The customer service agent may then highlight features, attributes, and/or characteristics of the product that corresponds to the highly aligned partiality vectors to the customer during the customer service session.

In some embodiments, the system may further select one or more promotional content based on the customer partiality vectors for the particular customer and provide the one or more promotional content for playback via the customer service agent user interface. Promotional content may comprise one or more of a video clip, an audio clip, an image, an interactive content, etc. that correspond to a particular product, a brand, and/or a group of products. In some embodiments, the promotional content may be associated with one or more of product characteristics and/or customer partialities. For example, different promotional content highlighting the exterior design and the technology specification of a television set may be available. The system may select from the available promotional contents associated with the product or a group of products based the content's alignment with the customer's partiality vectors. In some embodiments, the promotional content may be displayed on one or more of a customer's personal user device, an in-store kiosk, a store display, and an in-store customer service agent device. For example, a customer service agent may cause an image or a video to be display on the customer device by selecting the image or video on the customer service user interface and explain the features of the product to the customer.

In some embodiments, the system may further select a script for communicating with the customer based on the customer partiality vectors for the particular customer and cause the customer service agent user interface to display the script to the customer service agent. Scripts may generally refer to texts or outlines configured to guide the customer service agent's interaction with the customer. In some embodiments, scripts may comprise text that can be read out to the customer and/or pasted into chat windows. In some embodiments, scripts and/or sets of scripts may be associated with one or more of product characteristics and/or customer partialities. For example, different scripts highlighting the exterior design and the technology specification of a television set may be available. The system may select from the available scripts associated with the product based the script's alignment with the customer's partiality vectors.

In some embodiments, the system may further be configured to select one or more alternate items as purchase recommendations. For example, the system may determine an item type associated with the item selected by the customer, compare the customer partiality vectors with a plurality of similar items offered for sale, and display one or more items with the high alignment with the customer partialities as the alternate items on the customer service agent user interface. A customer service agent may then recommend the alternate product to the customer during a customer service session.

Figure 19:
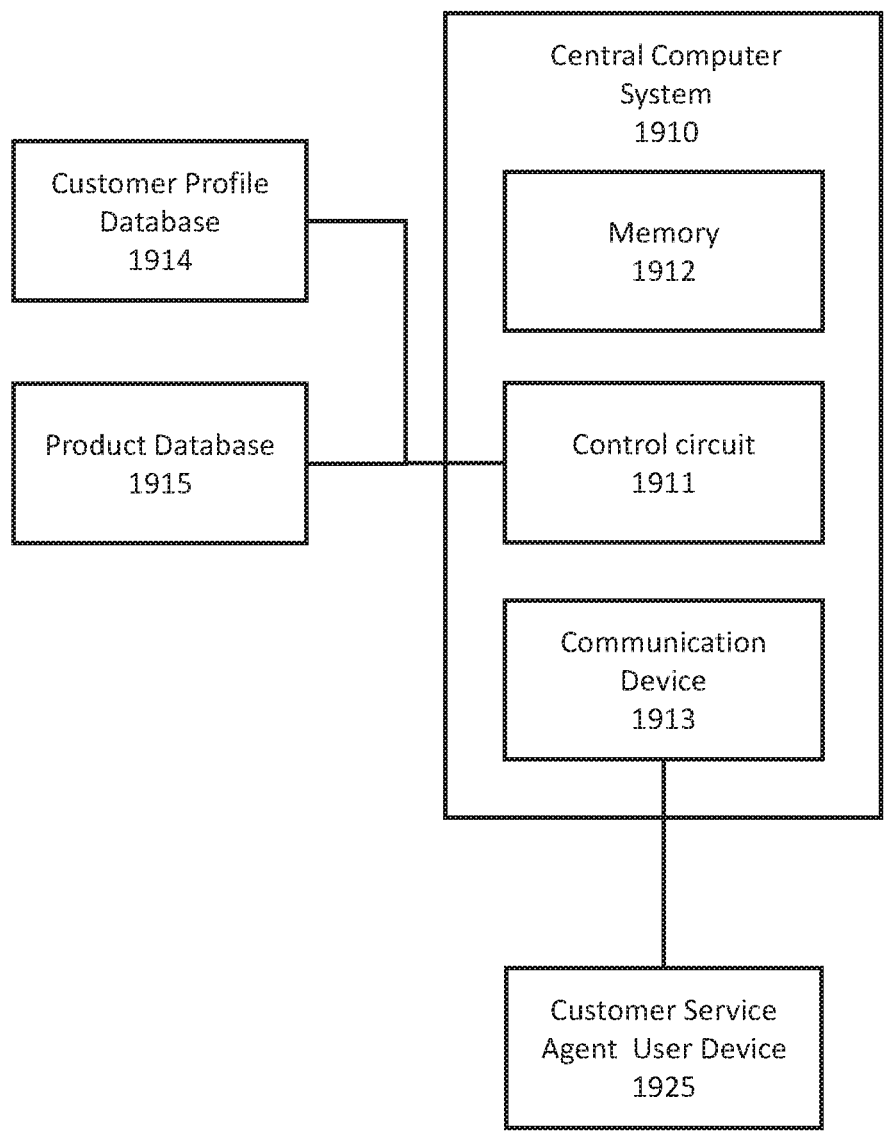
FIG. 19 comprises a block diagram as configured in accordance with various embodiments of these teachings.

Referring next to FIG. 19, a block diagram of a system according to some embodiments is shown. The system comprises a central computer system 1910, a customer profile database 1914, a product database 1915, and a customer service agent user device 1925.

The central computer system 1910 may comprise a processor-based system such as one or more of a server system, a computer system, a cloud-based server, a customer service computer system, a retail management system, and the like.

The control circuit 1911 may comprise a processor, a central processor unit, a microprocessor, and the like. The memory 1912 may comprise one or more of a volatile and/or non-volatile computer readable memory devices. In some embodiments, the memory 1912 stores computer executable codes that cause the control circuit 1911 to provide a customer service agent user interface to the customer service agent user device 1925, associated a customer with a customer service agent, retrieve customer value vectors from the customer profile database 1914, and cause the customer service agent user device 1925 to display the partiality and/or value vector. In some embodiments, the control circuit 1911 may be configured determine product characteristics that may be of interest of the customer based on the customer's partiality vectors and product information stored in the product database 1915 and cause the characteristics to be displayed on the customer service agent user device 1925. In some embodiments, the control circuit 1911 may be configured to select a customer service agent, promotional content, and/or customer service script for a customer service session based on the customer's partiality vectors. In some embodiments, computer executable code causes the control circuit 1911 to perform one or more steps described with reference to FIG. 18 herein.

The communication device 1913 may comprise one or more of a wired and wireless communication devices such as a network adapter, a data port, a Wi-Fi transceiver, a modem, etc. In some embodiments, the communication device 1913 may be configured to communicate with one or more the customer service agent user devices 1925 via a network such as one or more of the Internet, an intranet, a secured data connection, a Wi-Fi network, and a mobile data network.

The central computer system 1910 may be coupled to the customer profile database 1914 and/or the product database 1915 via a wired and/or wireless communication channel. The customer profile database 1914 may be configured store customer profiles for a plurality of customers. Each customer profile may comprise one or more of customer name, customer address, customer demographic information, customer partiality vectors, and customer purchase history. Customer partiality vectors may comprise one or more of a customer value vectors, customer preference vectors, and customer affinity vectors. In some embodiments, the customer partiality vectors may be determined and/or updated based on one or more of customer purchase history, customer survey input, customer item return history, and/or customer return comments. In some embodiments, customer partialities determined from a customer's purchase history in one or more product categories and may be used to match the customer to a product in a category from which the customer has not previously made a purchase. For example, customer partialities determined from the customer's purchase of snacks and pet foods may indicate that the user values natural products. The vector and magnitude associated with natural products may then be used to match the user to products in the beauty and personal care categories.

The product database 1915 may store one or more profiles of products offered for sale in one or more retail and/or online stores. In some embodiments, the product profiles may associate product identifiers (e.g. Universal Product Code (UPC), barcode, product name, brand name, etc.) with vectorized product characterizations. In some embodiment, the vectorized product characterizations may comprise one or more of vectors associated with customer values, preferences, affinities, and/or aspirations in reference to the products. For example, a product profile may comprise of vectorized product characterization that includes a magnitude that corresponds to how well the product aligns with a customer's cruelty-free value vector. In some embodiments, the vectorized product characterizations may be determined by one or more of product packaging description, product ingredients list, product material, product specification, brand reputation, customer feedback, customer purchase history, and the like.

While the customer profile database 1914 and the product database 1915 are shown outside the central computer system 1910 in FIG. 19, in some embodiments, the customer profile database 1914 and the product database 1915 may be implemented as part of the central computer system 1910 and/or the memory 1912. In some embodiments, the customer profile database 1914 and the product database 1915 comprise database structures that represent customer partialities and product characterizations, respectively, in vector form.

The customer service agent user device 1925 may comprise a processor-based device associated with a customer service agent. In some embodiments, the customer service agent may comprise one or more of a retail store customer service agent, an online store customer service agent, a remote customer service agent, etc. In some embodiments, the customer service agent user device 1925 may comprise one or more of a desktop computer, a laptop computer, a mobile device, a portable device, a personal computer, a smartphone, a wearable device, a head held device, a head mounted display (HMD), an augmented reality display, etc. The customer service agent user device 1925 may be configured to provide a customer service agent user interface to a customer service agent. In some embodiments, the customer service agent user interface may comprise one or more of a mobile application, a computer program, an augmented reality display program, a web-based user interface and the like. In some embodiments, the customer service agent user interface may be provided by the central computer system 1910 and/or at least partially stored on a memory device on the customer service agent user device 1925.

In some embodiments, the customer service agent user device 1925 comprises a communication device such as a data port, a network adapter, a Wi-Fi transceiver, a cellular signal transceiver, a mobile data network transceiver, a Bluetooth transceiver, etc. for communicating with the central computer system 1910 via a network such as one or more of the a in-store network, a mobile data network, a secured data network, and the Internet. In some embodiments, the customer service agent user device 1925 comprises user input/output devices such as one or more of a display screen, a touch screen, a head mounted display, a microphone, a speaker, one or more buttons, a touch pad, a motion sensor, an eye tracker, a gesture sensor, etc. In some embodiments, the customer service agent user device 1925 comprises a display device for displaying information relating to customer partiality vectors to the customer service agent. In some embodiment, an augmented reality type display may be configured to display the customer's partiality vectors to the side of the customer service agent's field of view as the customer service agent interacts with the customer in person or over a video. In some embodiment, an augmented reality type display may be configured to display product characteristics next to a customer service agent's real-world view of a product. For example, the system may determine one or more product characteristics that may be of interest to the customer based on the customer's partiality vectors and cause the selected characteristics to be displayed/emphasized on the customer service agent user interface. In some embodiments, a remote customer service computer program may be configured to display customer value vectors and/or product compatibility within or next to a chat window or video of the customer service session. Generally, the customer service agent user device 1925 may comprises various user input/out devices configured to allow the customer service agent to interact with the customer service agent user interface provided by the central computer system 1910. In some embodiments, the customer service agent user device 1925 and/or the customer service agent user interface provided on the device are further configured to facility the interaction between the customer and the customer service agent.

In some embodiments, the central computer system 1910 and/or the customer service agent user device 1925 may further communicate with a customer user device associated with the customer. A customer user device may be a processor-based device and may comprise one or more of an in-store kiosk, a desktop computer, a laptop computer, a mobile device, a portable device, a personal computer, a smartphone, a wearable device, a head held device, a head mounted display (HMD), an augmented reality display, etc. In some embodiments, the customer user device be configured to provide a customer user interface comprising one or more of a mobile application, a computer program, an augmented reality display program, web-based user interface. In some embodiments, a customer may use the customer user interface to request a customer service, enter customer identifier, and/or enter product identifier. In some embodiments, the customer user interface may be configured to collect item identifier information to send to the central computer system 1910. In some embodiment, item identifiers may be entered by a customer using a user input/out device via the customer user interface. In some embodiments, the customer user device may comprise one or more sensors such as a camera, an optical sensor, a barcode scanner, a RFID scanner, etc. In some embodiments, the customer user interface may comprise an item identification interface for entering/capturing item identifiers. For example, an in-store kiosk may include a barcode scanner for scanning items that the customer brought to the kiosk. In some embodiments, a customer service agent user device 1925 carried by an in-store customer service agent may include similar sensors and/or user interfaces for gathering product identifier. In some embodiments, a customer may describe a product to a customer service agent, and the customer service agent may enter/select the product via the customer service agent user interface.

In some embodiments, a customer user device may be optional to the system. For example, if a customer calls a customer service agent and/or speaks to an in-store customer service agent, a customer user device may not be involved in providing customer service. In some embodiments, retail stores may include in-store customer service kiosks. A customer may enter a customer identifier and/or a product identifier (e.g. enter name, scan barcode, etc.) at the customer service kiosk and interact with the on-site or remote customer service agent via the kiosk. In some embodiments, the kiosk comprises a video screen and an image sensor for facilitating a video-based interaction between the customer service agent and the customer. In some embodiments, the customer service agent user interface may be configured control the display of content on the customer service kiosk and/or other customer user devices during a customer service session via a customer service agent user interface.

While only one customer service agent user device 1925 in shown in FIG. 19, the central computer system 1910 may simultaneously provide customer service agent user interfaces to a plurality of customer service agent user devices 1925. In some embodiments, the central computer system 1910 may further be configured to match a request for customer service with a customer service agent. In some embodiments, a customer service agent may be selected for a customer based on the alignment between their respective partiality values. In some embodiments, a customer service agent may be selected further based on one or more of customer service agent availability, customer service specialty (e.g. electronics, apparel, home improvement, etc.), customer selected product, and customer location.

Figure 20A:
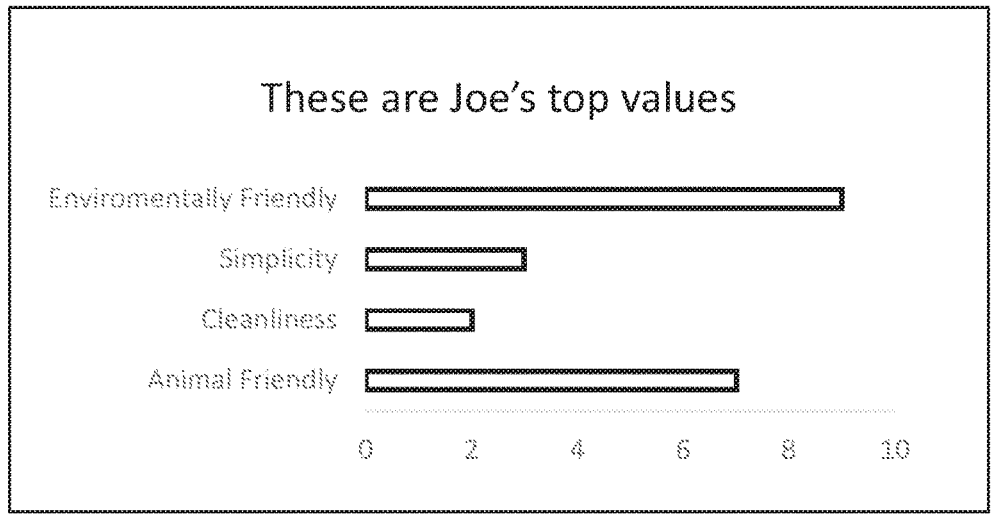
FIGS. 20A and 20B comprise illustrations of user interfaces in accordance with various embodiments of these teachings.

Next referring to FIGS. 20A and B, illustrations of example screen displays of a customer service agent user interface is shown. FIG. 20A illustrates an example display of customer partiality vectors. In FIG. 20A, magnitudes of vectors associated with "environmentally friendly," "simplicity," "cleanliness," and "animal friendly" are displayed via a customer service agent user interface. In some embodiments, the screen shown in FIG. 20A may be displayed after a customer service agent is associated with a customer (e.g. Joe). In some embodiments, the user interface may select the partiality vectors with the highest magnitudes to display. In some embodiments, the user interface may select the partiality vectors most relevant to the product or product category selected by the customer. In some embodiments, a user may scroll in the user interface to see additional partiality vectors. In some embodiments, the partiality vectors may be indicated as one of a value vector, a preference vector, or an affinity vector. For example, different types of partiality vectors be displayed in different colors. In some embodiments, selectable promotional content and/or scripts may further be included in the user interface display. In some embodiments, customer partiality vectors may be shown on the customer service agent user interface along with a chat window and/or video window of the customer service session. In some embodiments, with an augmented reality type display, the customer partiality vectors may be shown to the side of the customer service agent's field of view while they speak to the customer in person or over a video. In some embodiments, the screen shown in FIG. 20A may be displayed as part of step 1804 described with reference to FIG. 18 herein.

Figure 20B:
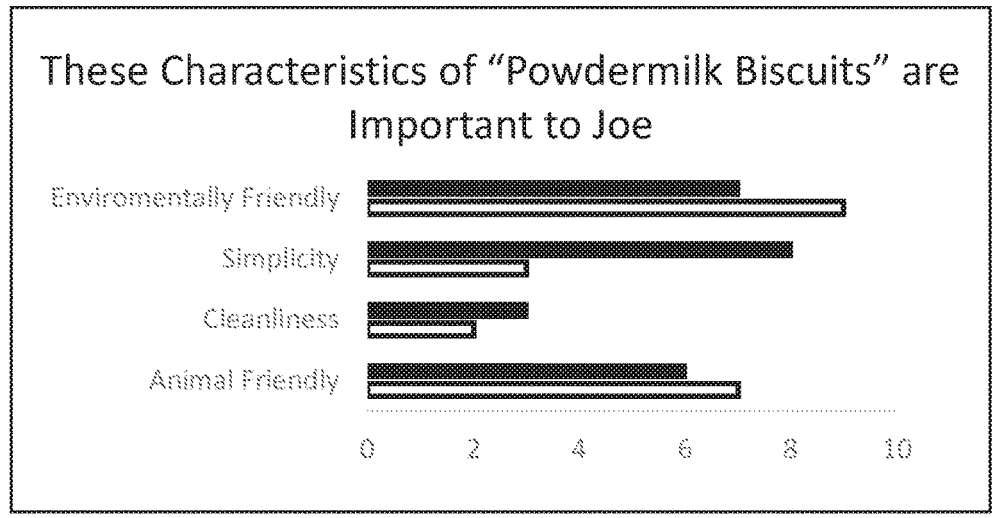

FIG. 20B illustrates an example display of customer and product compatibility. In FIG. 20B, the product characterization vectors of "powdermilk biscuits" (solid bars) are shown with the partiality vectors of Joe (white bars). The comparison of the product and the customer may be shown after a customer select a product to inquire before or during the customer service session. For example, the customer and/or a customer service agent may scan a barcode and/or RFID tag on the product selected by the customer. In some embodiments, a customer may describes the product to a customer service agent who then enters the product information via the customer service agent user interface. The customer service agent user interface may select characteristics of the product to emphasize to the customer based on the customer's partiality vectors. In some embodiments, the system may select customer partiality vectors and product characterization vectors with high degrees of alignment as characteristics to emphasise and highlight these characteristics in the customer service agent user interface. In some embodiments, the user interface may further be configured to provide promotional content and/or script selected based on the relevant characteristics of the product and/or customer partiality vectors to the customer service agent. In some embodiments, the user interface may further be configured to recommend a similar product that may be more compatible with the customer's partiality vectors.

While bar graphs are shown in FIGS. 20A and 20B, various types of different graphics and texts may be used to represent customer partiality vectors and/or product characterization vectors without departing from the spirit of the present disclosure. In some embodiments, the customer partiality vectors and product characterization vectors may be represented by text and/or in one of more of a line graph, a bar graph, a radar chart, a circle graph, and the like. While the same partiality vectors are shown in FIGS. 20A and 20B, in some embodiments, different partiality vectors may be prioritized for display based on the product's category and/or the alignment between a customer partiality vectors and a product's characterization vectors. In some embodiments, the user interface may visually highlight one or more customer partiality and/or product characterization based on the degree of vector alignment.

In one embodiment, a system for providing customer service agent assistance comprises a customer profile database storing customer partiality vectors for a plurality of customers, the customer partiality vectors comprise customer value vectors, a communication device, and a control circuit coupled to the customer profile database and the communication device, the control circuit being configured to: provide a customer service agent user interface on a user device associated with a customer service agent, associate a particular customer with the customer service agent, retrieving at least one customer value vector for the particular customer from the customer profile database, and cause, via the communication device, the at least one customer value vector of the particular customer to be displayed on the customer service agent user interface of the user device.

In one embodiment, a method for customer service agent assistance comprises providing, with a control circuit and a communication device coupled to the control circuit, a customer service agent user interface on a user device associated with a customer service agent, associating, with the control circuit, a particular customer with the customer service agent, retrieving, with the control circuit, at least one customer value vector of the particular customer from the customer profile database storing customer partiality vectors for a plurality of customers, the customer partiality vectors comprise customer value vectors, and causing, via the communication device, the at least one customer value vector for the customer to be displayed on the customer service agent user interface.

In one embodiments, an apparatus for mapping a space comprises a non-transitory storage medium storing a set of computer readable instructions; and a control circuit configured to execute the set of computer readable instructions which causes to the control circuit to: provide, via a communication device coupled to the control circuit, a customer service agent user interface on a user device associated with a customer service agent, associate a particular customer with the customer service agent, retrieve at least one customer value vector for the particular customer from the customer profile database storing customer partiality vectors of a plurality of customers, the customer partiality vectors comprise customer value vectors, and cause, via the communication device, the at least one customer value vector for the customer to be displayed on the customer service agent user interface.

Shopping agents generally refer to agents who browse and select items for a customer. For example, the shopping agent may select items in a brick-and-mortar retail store and/or an online retail store for a customer who pays for the purchase either directly or via the shopping agent. A customers may select the exact product(s) that they want the shopping agent to purchase, may only indicate a generate type of items (e.g. eggs, detergent, etc.), and/or may express a general need (e.g. snacks, ingredients for a dish) and rely on the shopping agent to select from the available products to purchase. In some embodiments, the systems and methods described herein function to assist shopping agents in selecting items for the customers.

In one embodiment, a system for providing shopping agent assistance comprises a customer profile database storing customer partiality vectors for a plurality of customers, the customer partiality vectors comprise customer value vectors, a communication device, and a control circuit coupled to the customer profile database and the communication device. The control circuit being configured to provide a shopping agent user interface on a user device associated with a shopping agent, associate a customer with the shopping agent, retrieving at least one customer value vector for the customer from the customer profile database, and cause, via the communication device, the at least one customer value vector of the customer to be displayed on the shopping agent user interface of the user device.

Figure 21:
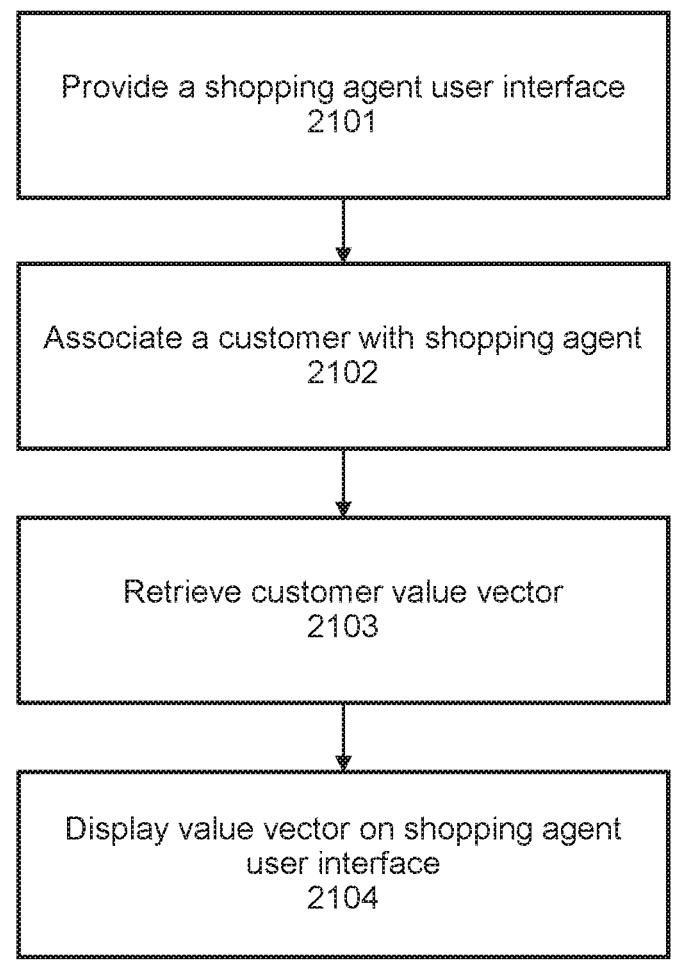
FIG. 21 comprise a flow diagram as configured in accordance with various embodiments of these teachings.

Referring next to FIG. 21, a method for providing shopping agent assistance according to some embodiments is shown. The steps in FIG. 21 may generally be performed by a processor-based device such as a central computer system, a server, a cloud-based server, a shopping agent service management system, a retail management system, etc. In some embodiments, the steps in FIG. 21 may be performed by one or more of the control circuit 1301 described with reference to FIG. 13, the control circuit 2211, and the shopping agent user device 2225 described with reference to FIG. 22 herein.

In step 2101, the system provides a shopping agent user interface to a user device associated with a shopping agent. In some embodiments, the user device associated with the shopping agent may comprise one or more of a mobile device, a portable device, a personal computer, a smartphone, a wearable device, a head mounted display (HMD), an augmented reality display, etc. The user device associated with a shopping agent may comprise a processor-based device that include one or more user input/output devices such as one or more of a display screen, a touch screen, a head mounted display, a microphone, a speaker, one or more buttons, a touchpad, a motion sensor, an eye tracker, a gesture sensor, etc. In some embodiments, the shopping agent user interface may comprise one or more of a mobile application, a computer program, an augmented reality display program, a web-based user interface and the like.

In step 2102, the system associates a customer with the shopping agent. In some embodiments, the customer may be associated with the shopping agent based on one or more of a current location of the shopping agent, one or more customer orders, and a customer selection received in the shopping agent user interface, In some embodiments, the shopping agent may enter a customer selection via the shopping agent user interface. In some embodiments, the shopping agent may enter an identifier (e.g. name, user ID, customer number, etc.) associated with the customer in the shopping agent user interface. In some embodiments, the shopping agent may first log into the user interface and the system may display one or more customer profiles of customers who have been assigned to the shopping agent. In some embodiments, the customer may be associated with the shopping agent based on the shopping agent's location and the items selected by the customer. For example, when a shopping agent arrives at a brick-and-mortar retail location, the system may display a list of customers that has ordered items from that retail location in the shopping agent user interface.

In some embodiments, the customer may be associated with a shopping agent by comparing the partiality vectors of the customer with a plurality of shopping agents. For example, when a customer requests shopping agent service, a shopping agent in the customer's service area may be selected based on how well the partiality vectors of the shopping agent aligns with the partiality vectors of the customer. In some embodiments, the partiality vector alignment between the customer and the customer service agent may be determined by adding, subtracting, multiplying, and/or dividing the magnitudes of the corresponding vectors of the customer partiality vectors and product characterization vectors. For example, a score for each vector may be determined by multiplying the magnitudes of the vectors and/or an overall alignment score may be determined by adding and/or averaged individual vector scores. In some embodiments, agents may be ranked and/or prioritized for a customer based on the degree of alignment between the partiality vectors of the customer service agent and the customer, and the system may use the ranking to select an agent for the customer. In some embodiments, only a subset of partiality vectors may be compared when selecting a customer service agent for a customer. For example, the system may only select a customer service agent based on the alignment of value vectors.

In some embodiments, a customer may select a shopping agent to associate with when he/she request the shopping agent service. For example, a customer user interface may present for selection, a list of shopping agents who the customer had previously work with and/or is a good match with the customer based on the customer's partiality vectors. Generally, a shopping agent may be employed by a retail store or a shopping agent service, may be a freelance and/or crowdsourced shopping agent, or may be a personal friend or family of the customer without departing from the spirit of the present disclosure. In some embodiments, one or more individuals may be associated with the shopping agent in step 2102. In some embodiments, one or more members of a group (e.g. household, office, social gathering, event, etc.) requesting shopping agent service may have a customer profile associated with them. When a shopping agent is shopping for the entire group, each customer in the group having a customer profile may be associated with the shopping agent in step 2102. In some embodiments, a shopping agent may shop on behalf of multiple individual customers making separate orders during a shopping trip and one or more of the customers associated with the shopping trip may be associated in step 2102.

In step 2103, the system retrieves customer value vectors associated with a customer. In some embodiments, the customer value vectors may be retrieved from a customer profile database storing customer partiality vectors for a plurality of customers using one or more customer identifiers (e.g. customer name, customer ID, etc.). The customer may generally be a customer participating in a shopping agent service. In some embodiments, the customer partiality vectors each represents at least one of a person's values, preferences, affinities, aspirations. In some embodiments, customer partiality vectors each comprises a magnitude that corresponds to the customer's belief in good that comes from an order associated with that value. In some embodiments, the customer partiality vectors, including value vectors, may be determined and/or updated with the purchase and/or return history of associated with the customer. In some embodiments, if multiple customers are associated with the shopping agent, the system may retrieve customer partiality vectors associated with each customer associated in step 2103.

In step 2104, the system displays customer value vectors on the shopping agent user interface. In some embodiments, the customer partiality vectors may be provided to a user device associated with the shopping agent to display via a shopping agent user interface. In some embodiments, the shopping agent user interface may be configured to display one or more partialities associated with the customer and the vector magnitudes associated with the partialities. In some embodiments, the customer value vectors and/or partiality vectors may be presented in a graphical format such as one or more of a line graph, a bar graph, a radar chart, a circle graph, and the like. Generally, the shopping agent user interface may be configured to display the value vectors and/or other partiality vectors in any text and/or graphical format to convey the customer values and magnitudes of the values. In some embodiments, if multiple customers are associated with the shopping agent in step 2102, partiality vectors for one or more customer may be displayed on the shopping agent user interface. In some embodiments, if a plurality of customers comprises a group that shares a purchase, the system may be configured to average the magnitudes of a plurality of vectors and/or display the highest and/or lowest magnitudes associated with each partiality vector. In some embodiments, the user interface may select one or more partiality vectors among the partiality vectors in a customer's profile to display. In some embodiments, the user interface may initially display customer partiality vectors with the highest magnitudes. In some embodiments, the user interface may initially display customer partiality vectors that are relevant to one or more products types the customer wish to purchase. In some embodiments, the display of the partiality vectors may be interactive. For example, a shopping agent may select different partiality vectors to view. In another example, a shopping agent may select an item category (e.g. produce, apparel, household supply, etc.) and the user interface may display partiality vectors that are more relevant to the selected item category.

In some embodiments, the system may further be configured to determine a compatibility between an item selected by the shopping agent and the user's partiality vectors, including value vectors. In some embodiments, the system may receive a product identifier via the user device associated with the shopping agent. For example, the product identifier may be received from the shopping agent user interface via one or more of a barcode, a Radio Frequency Identification (RFID) tag, a photograph, a product name, and a brand name. The system may then retrieve vectorized product characterizations associated with the product identifier from a product database and compare the customer partiality vectors and the vectorized product characterizations of the selected product. In some embodiments, the customer partiality vectors, including customer value vectors, and the vectorized product characterizations may be compared to determine a degree of alignment between the customer and one or more products. In some embodiments, the alignment between a product and a customer may be determined by adding, subtracting, multiplying, and/or dividing the magnitudes of the corresponding vectors in the customer partiality vectors and product characterization vectors. For example, an alignment score for each vector may be determined by subtracting the magnitude of the customer vector from the magnitude of the associated product characterization vector. In some embodiments, compatibility between the customer and the product may be determined based on whether the scores of each vector exceeds a set score (e.g. 0, −1, etc.). In some embodiments, a score for each vector may be determined by multiplying the magnitudes of the customer vector and the associated product characterization vector. In some embodiments, scores for each vector may be added and/or averaged to determine an overall alignment score. In some embodiments, compatibility between the customer and the product may be determined based on the alignment score, for example, whether the overall alignment score exceeds a threshold. In some embodiments, an item may be considered to be compatible to if the alignment between the customer partiality vectors and the vectorized product characterizations exceeds a threshold. In some embodiments, the system may determine that a product is compatible with a customer only if each product characterization vector matches or exceeds the corresponding customer partiality vector. In some embodiments, products may be ranked and/or prioritized for the customer based on the degree of alignment between the customer partiality vectors and the product characterization vectors. In some embodiments, compatibility may comprise a binary indicator (e.g. compatible/not compatible), a gradient score (e.g. 1-10), a color, and/or a text descriptor (e.g. poor match, good match, excellent match, etc.).

In some embodiments, after the system determines a compatibility between the customer and the item selected by the shopping agent, the system causes the shopping agent user interface to display the compatibility. In some embodiments, product compatibility comprises a score and the shopping agent user interface may be configured to display a visual representation of the score. In some embodiments, the compatibility of one or more individual partiality vectors may be displayed. In some embodiments, the system may display a combined compatibility based on a plurality of customer partiality vectors. In some embodiments, the shopping agent user interface may be configured to display a list of items selected for a customer and a compatibility indicator next to each item selected for the customer. For example, a color coded icon (e.g. red, yellow, green, etc.) may be displayed next to items on the shopping list. In some embodiments, a compatibility indicators may be included in the display of a virtual shopping cart for an online and/or brick-and-mortar store purchase. In some embodiments, an augmented reality display device may be configured to display a compatibility indicator and/or vectorized product characteristics as an overlay of the shopping agent's view of a real-world product.

In some embodiments, the system may further be configured to suggest an alternate item to purchase based on the customer's partiality vectors. For example, the system may determine an item type associated with the selected item, compare the customer partiality vectors with a plurality of similar items offered for sale, and recommend an item with a higher alignment score with the customer partialities as the alternate item.

In some embodiments, after step 2104, the system may prompt the customer for feedback regarding the shopping agent and/or one or more items purchased by the shopping agent. In some embodiments, customer's feedback of the purchase may be used to update customer profile. For example, the customer's rating of one or more items selected by a shopping agent may be used to update the customer's partiality vectors stored in the customer profile database.

Figure 22:
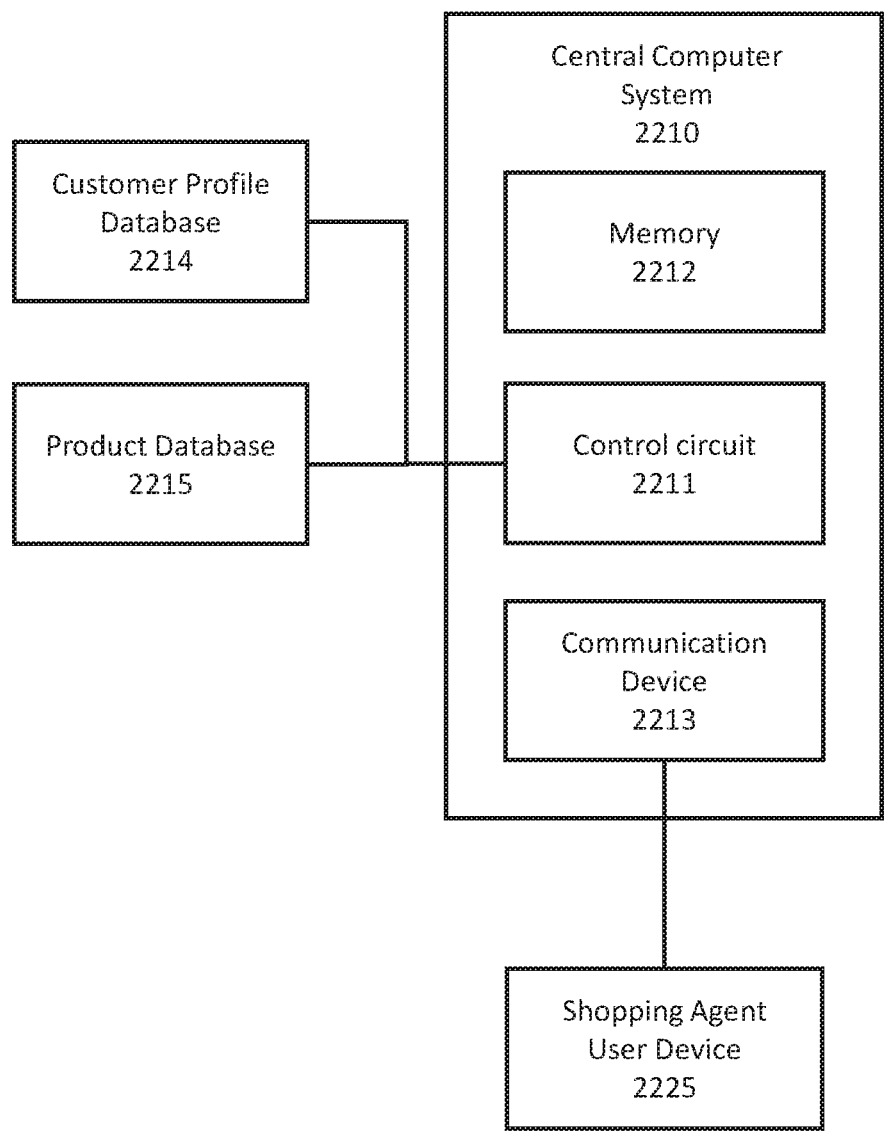
FIG. 22 comprises a block diagram as configured in accordance with various embodiments of these teachings.

Referring next to FIG. 22, a block diagram of a system according to some embodiments is shown. The system comprises a central computer system 2210, a customer profile database 2214, a product database 2215, and a shopping agent user device 2225.

The central computer system 2210 may comprise a processor-based system such as one or more of a server system, a computer system, a cloud-based server, a shopping agent service management computer system, a retail management system, and the like. The control circuit 2211 may comprise a processor, a central processor unit, a microprocessor, and the like. The memory 2212 may comprise one or more of a volatile and/or non-volatile computer readable memory devices. In some embodiments, the memory 2212 stores computer executable codes that cause the control circuit 2211 to provide a shopping agent user interface to the shopping agent user device 2225, associated a customer with a shopping agent, retrieve customer value vectors from the customer profile database 2214, and cause the shopping agent user device 2225 to display the value vector. In some embodiments, the control circuit 2211 may be configured to determine the compatibility between the customer and one or more items based on product information stored in the product database 2215 and cause the compatibility to be displayed on the shopping agent user device 2225. In some embodiments, computer executable code causes the control circuit 2211 to perform one or more steps described with reference to FIG. 21 herein.

The communication device 2213 may comprise one or more of a wired and wireless communication devices such as a network adapter, a data port, a Wi-Fi transceiver, a modem, etc. In some embodiments, the communication device 2213 may be configured to communicate with one or more the shopping agent user devices 2225 via a network such as one or more of the Internet, a secured data connection, and a mobile data network.

The central computer system 2210 may be coupled to the customer profile database 2214 and/or the product database 2215 via a wired and/or wireless communication channel. The customer profile database 2214 may be configured store customer profiles for a plurality of customers of a shopping agent service. Each customer profile may comprise one or more of customer name, customer address, customer demographic information, and customer partiality vectors. Customer partiality vectors may comprise one or more of a customer value vectors, customer preference vectors, and customer affinity vectors. In some embodiments, the customer partiality vectors may be determined and/or updated based one or more of customer purchase history, customer survey input, customer item return history, and/or customer return comments. In some embodiments, customer partialities determined from a customer's purchase history in one or more product categories and may be used to match the customer to a product in a category from which the customer has not previously made a purchase. For example, customer partialities determined from the customer's purchase of snacks and pet foods may indicate that the user values natural products. The value vector and magnitude associated with natural products may then be used to match the user to products in the beauty and personal care categories.

The product database 2215 may store one or more profiles of products offered for sale in one or more retail and/or online stores. In some embodiments, the product profiles may associate product identifiers (e.g. Universal Product Code (UPC), barcode, product name, brand name, etc.) with vectorized product characterizations. In some embodiment, the vectorized product characterizations may comprise one or more vectors associated with customer values, preferences, affinities, and/or aspirations in reference to the products. For example, a product profile may comprise of vectorized product characterization that includes a magnitude that corresponds to how well the product aligns with a customer's cruelty-free value vector. In some embodiments, the vectorized product characterizations may be determined by one or more of product packaging description, product ingredients list, product material, product specification, brand reputation, customer feedback, customer purchase history, and the like.

While the customer profile database 2214 and the product database 2215 are shown outside the central computer system 2210 in FIG. 22, in some embodiments, the customer profile database 2214 and the product database 2215 may be implemented as part of the central computer system 2210 and/or the memory 2212. In some embodiments, the customer profile database 2214 and the product database 2215 comprise database structures that represent customer partialities and product characterizations, respectively, in vector form.

The shopping agent user device 2225 may comprise a processor-based device associated with a shopping agent. In some embodiments, the shopping agent may comprise one or more of a retail store associate, an in-store picker, a contracted service provider, a shopping agent service employee, a crowdsourced service provider, a friend, a family member, etc. Generally, a shopping agent may be any person who shops for the actual consumer of the purchased items.

In some embodiments, the shopping agent user device 2225 may comprise one or more of a mobile device, a portable device, a personal computer, a smartphone, a wearable device, a head mounted display (HMD), an augmented reality display, etc. The shopping agent user device 2225 may be configured to provide a shopping agent user interface to a shopping agent. In some embodiments, the shopping agent user interface may comprise one or more of a mobile application, a computer program, an augmented reality display program, a web-based user interface and the like. In some embodiments, the shopping agent user interface may be provided by the central computer system 2210 and/or at least partially stored on a memory device on the shopping agent user device 2225.

In some embodiments, the shopping agent user device 2225 comprises a communication device such as a Wi-Fi transceiver, a cellular signal transceiver, a mobile data network transceiver, a Bluetooth transceiver, etc. for communicating with the central computer system 2210 via a network such as one or more of an in-store network, a mobile data network, a secured data network, and the Internet. In some embodiments, the shopping agent user device 2225 comprises user input/output devices such as one or more of a display screen, a touch screen, a head mounted display, a microphone, a speaker, one or more button, a touch pad, a motion sensor, an eye tracker, a gesture sensor, etc. In some embodiments, the shopping agent user device 2225 comprises a display device for displaying information relating to customer partiality vectors to the shopping agent. In some embodiment, an augmented reality type display may be configured to display the customer's partiality vectors to the side of the shopping agent's field of view as the shopping agent walks around a store to select items for purchase. In some embodiment, an augmented reality type display may be configured to display product compatibility next to a shopping agent's real-world view of a product. In some embodiments, a website and/or a web browser extension may be configured to display customer partiality vectors and/or product compatibility within or next to an online shopping interface. For example, a shopping agent may enter customer identifier into a website or a browser extension, and a product compatibility identifier may be displayed next to one or more items offered for sale in an online shopping user interface. Generally, the user input/out devices may be configured to allow the shopping agent to interact with the shopping agent user interface provided by the central computer system 2210.

In some embodiments, the shopping agent user device 2225 may be configured to collect item identifier information to send to the central computer system 2210. In some embodiment, item identifiers may be entered by a shopping agent using a user input/out device via the shopping agent user interface. In some embodiments, the shopping agent user device 2225 may comprise one or more sensors such as a camera, an optical sensor, a barcode scanner, a RFID scanner, etc. In some embodiments, the shopping agent user device 2225 may comprise an image sensor for capturing an image of a product (e.g. labeling, text, barcode, signage etc.) to identify the product. In some embodiments, the shopping agent user interface may comprise an item identification interface for entering/capturing item identifiers. The central computer system 2210 may compare the vectorized item characterization associated with the item identifier stored in the product database 2215 with the partiality vectors associated with a customer stored in the customer profile database 2214 to determine a compatibility between the item and the customer. In some embodiments, the shopping agent user interface may then display a representation of the compatibility to the shopping agent via the shopping agent user device 2225.

In some embodiments, compatibility between a customer and a product may comprise a binary indicator (e.g. compatible/not compatible), a gradient score (e.g. 1-10), a color, and/or a text descriptor (e.g. poor match, good match, excellent match, etc.) In some embodiments, product compatibility comprises a score and the shopping agent user interface may be configured to display a visual representation of the score (e.g. color, icon, graphic elements, etc.). In some embodiments, the compatibilities of one or more individual partiality vectors may be displayed. In some embodiments, the system may display an overall compatibility. In some embodiments, the shopping agent user interface may be configured to receive and display a list of items selected for a customer and a compatibility indicator next to each item selected for the customer. For example, a color coded icon (e.g. red, yellow, green, etc.) may be displayed next to the listing of the item in the shopping list. In some embodiments, a compatibility indicators may be added to a virtual shopping cart display of an online and/or brick-and-mortar store checkout system. In some embodiments, an augmented reality display device may be configured to display a compatibility indicator over and/or next to a product being viewed by a shopping agent.

While only one shopping agent user device 2225 in shown in FIG. 22, the central computer system 2210 may simultaneously provide shopping agent user interfaces to a plurality of shopping agent user devices 2225 and shopping agents. In some embodiments, the central computer system 2210 may further communicate with one or more user devices associated with customers of the shopping agent service. For example, the central computer system 2210 may receive user selections and/or configurations regarding an order to be completed by a shopping agent via the customers' user devices. The central computer system 2210 may then forward the order information to the shopping agent user device 2225. In some embodiments, the central computer system 2210 may further be configured to match a customer requesting shopping agent service with a shopping agent. In some embodiments, a shopping agent may be selected for a customer based on their respective partiality values. In some embodiments, a shopping agent may be selected further based on one or more of shopping agent availability, shopping agent location, and customer location.

Figure 23A:
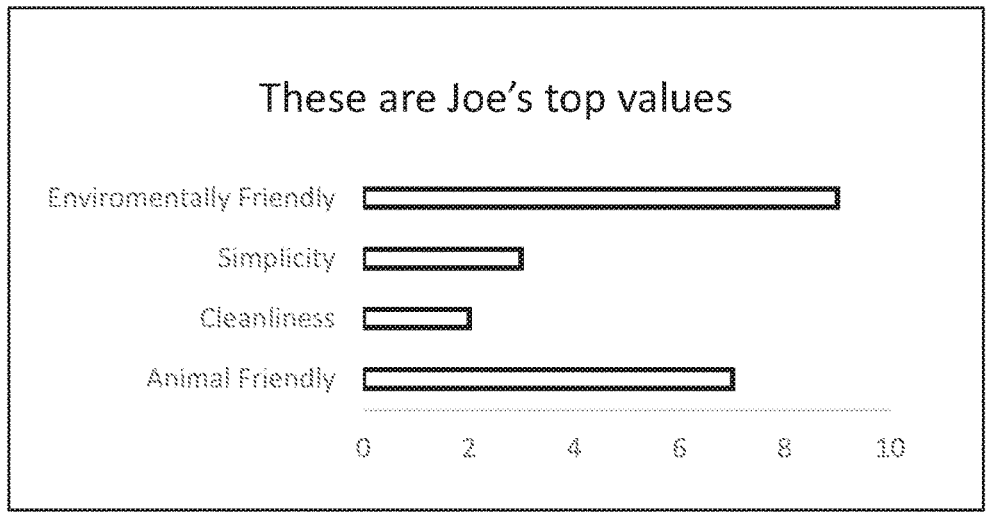
FIGS. 23A and 23B comprise illustrations of user interfaces in accordance with various embodiments of these teachings.

Next referring to FIGS. 23A and B, illustrations of example screen displays of a shopping agent user interface is shown. FIG. 23A illustrates an example display of customer partiality vectors on a shopping agent user interface. In FIG. 23A, magnitudes of vectors associated with "environmentally friendly," "simplicity," "cleanliness," and "animal friendly" are displayed via the shopping agent user interface. In some embodiments, the screen shown in FIG. 23A may be displayed after a shopping agent is associated with a customer (e.g. Joe). In some embodiments, the user interface may display the partiality vectors with the highest magnitudes among the partialities in the customer's profile. In some embodiments, the user interface may display the partiality vectors most relevant to the category of products the shopping agent is shopping for. In some embodiments, a user may scroll in the user interface to see additional partiality vectors. In some embodiments, the partiality vectors may be indicated as one of a value vector, a preference vector, or an affinity vector. For example, different types of partiality vectors may be displayed in a different color. In some embodiments, the screen shown in FIG. 23A may be displayed as part of step 2104 described with reference to FIG. 21 herein.

Figure 23B:
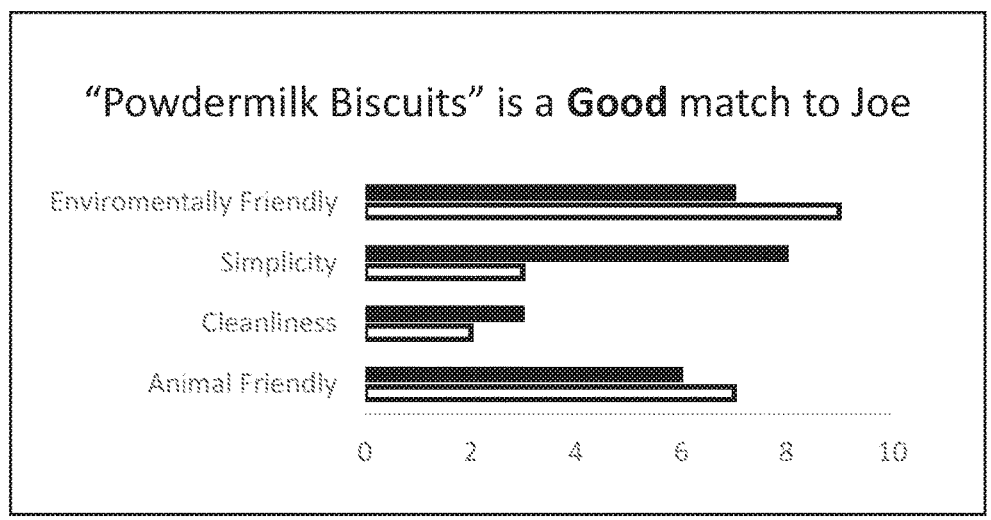

FIG. 23B illustrates an example display of customer and product compatibility. In FIG. 23B, the product characterization vectors of "powder milk biscuits" (solid bars) are shown with the partiality vectors of the customer (white bars). The display further includes an overall compatibility indicator (i.e. "good") between the product and the customer. The comparison of the product and the customer may be shown after a shopping agent selects a product to purchase for a customer. For example, the shopping agent may capture an image and/or scan a barcode and/or RFID tag on the product selected for the customer via the shopping agent user interface. The shopping agent user interface may then determine the degree of alignment between the product and the customer and display the compatibility in the user interface. In some embodiments, the user interface may display only a compatibility indicators and not the individual vector comparisons. In some embodiments, the compatibility indicator may comprise a binary indicator (e.g. good/bad match) and/or a score (e.g. 1-5, A-F, etc.). In some embodiments, the user interface may further be configured to suggest a similar product more compatible with the customer's partiality vectors for purchase.

While bar graphs are shown in FIGS. 23A and 23B, various types of different graphics and texts may be used to represent customer partiality vectors and/or product characterization vectors without departing from the spirit of the present disclosure. In some embodiments, the customer partiality vectors and product characterization vectors may be represented by text and/or with one or more of a line graph, a bar graph, a radar chart, a circle graph, and the like. In some embodiments, the compatibility between the product and the customer may be shown via showing the relative magnitudes of the one or more associated vectors. In some embodiments, an overall compatibility may be determined and displayed via one or more of text, number, color, and images. In some embodiments, the shopping agent user interface may allow the shopping agent to build a purchase list by scanning and/or selecting products and the shopping agent user interface may be configured to include a compatibility indicator next to each item on the purchase list. In some embodiments, in an augmented reality type display, FIG. 23A may be displayed when the shopping agent is walking around in a store, and FIG. 23B may be displayed when the shopping agent is looking directly at a product. While the same partiality vectors are shown in FIGS. 23A and 23B, in some embodiments, different partiality vectors may be prioritized for display based on their relevance to the selected product. For example, vectorized product characterization for a food item may not include a partiality vector related to energy efficiency, and the customer's energy efficiency vector may be omitted in the compatibility comparison and display.

In one embodiment, a system for providing shopping agent assistance comprises a customer profile database storing customer partiality vectors for a plurality of customers, the customer partiality vectors comprise customer value vectors, a communication device, and a control circuit coupled to the customer profile database and the communication device. The control circuit being configured to provide a shopping agent user interface on a user device associated with a shopping agent, associate a customer with the shopping agent, retrieving at least one customer value vector for the customer from the customer profile database, and cause, via the communication device, the at least one customer value vector of the customer to be displayed on the shopping agent user interface of the user device.

In one embodiment, a method for providing shopping agent assistance, comprises providing, with a control circuit and a communication device coupled to the control circuit, a shopping agent user interface on a user device associated with a shopping agent, associating, with the control circuit, a customer with the shopping agent, retrieving, with the control circuit, at least one value vector of the customer from the customer profile database storing customer partiality vectors for a plurality of customers, the customer partiality vectors comprise customer value vectors, and causing, via the communication device, the at least one customer value vector of the customer to be displayed on the shopping agent user interface.

In one embodiments, an apparatus for providing shopping agent assistance comprises a non-transitory storage medium storing a set of computer readable instructions, and a control circuit configured to execute the set of computer readable instructions which causes to the control circuit to: provide, via a communication device coupled to the control circuit, a shopping agent user interface on a user device associated with a shopping agent, associate a customer with the shopping agent, retrieve at least one customer value vector of the customer from the customer profile database storing customer partiality vectors for a plurality of customers, the customer partiality vectors comprise customer value vectors, and cause, via the communication device, the at least one customer value vector of the customer to be displayed on the shopping agent user interface.

Systems, apparatuses, and methods are provided herein for providing shopping agent assistance. A system for providing shopping agent assistance comprises a customer profile database storing customer partiality vectors for a plurality of customers, the customer partiality vectors comprise customer value vectors, a communication device, and a control circuit. The control circuit being configured to provide a shopping agent user interface on a user device associated with a shopping agent, associate a customer with the shopping agent, retrieving at least one customer value vector for the customer from the customer profile database, and cause, via the communication device, the at least one customer value vector of the customer to be displayed on the shopping agent user interface of the user device.

In some embodiments, a system for providing shopping agent assistance, comprises a customer profile database storing customer partiality vectors for a plurality of customers, the customer partiality vectors comprise customer value vectors, a communication device, and a control circuit coupled to the customer profile database and the communication device, the control circuit being configured to: provide a shopping agent user interface on a user device associated with a shopping agent, associate a customer with the shopping agent, retrieving at least one customer value vector for the customer from the customer profile database, and cause, via the communication device, the at least one customer value vector of the customer to be displayed on the shopping agent user interface of the user device.

In some embodiments, the customer partiality vectors each represents at least one of a person's values, preferences, affinities, and aspirations. In some embodiments, the customer partiality vectors each comprises a magnitude that corresponds to the customer's belief in good that comes from an order associated with that value. In some embodiments, the customer partiality vectors comprise partiality vectors determined from a purchase history of the customer. In some embodiments, the control circuit is further configured to: receive a product identifier via the user device and retrieve vectorized product characterizations associated with the product identifier from a product database. In some embodiments, the control circuit is further configured to determine a compatibility based on comparing the customer partiality vectors and the vectorized product characterizations and cause the shopping agent user interface to display the compatibility. In some embodiments, the compatibility comprises a score and the shopping agent user interface is configured to display a visual representation of the score. In some embodiments, the product identifier is received from the shopping agent user interface via one or more of a barcode, a Radio Frequency Identification (RFID) tag, a photograph, a product name, and a brand name. In some embodiments, the control circuit is further configured to: recommend one or more products to purchase for the customer based on the customer partiality vectors of the customer. In some embodiments, the customer is associated with the shopping agent based on one or more of a current location of the shopping agent, one or more customer orders, and a customer selection received in the shopping agent user interface.

In some embodiments, a method for providing shopping agent assistance comprises providing, with a control circuit and a communication device coupled to the control circuit, a shopping agent user interface on a user device associated with a shopping agent, associating, with the control circuit, a customer with the shopping agent, retrieving, with the control circuit, at least one value vector of the customer from a customer profile database storing customer partiality vectors for a plurality of customers, the customer partiality vectors comprise customer value vectors, and causing, via the communication device, the at least one customer value vector of the customer to be displayed on the shopping agent user interface.

In some embodiments, the customer partiality vectors each represents at least one of a person's values, preferences, affinities, and aspirations. In some embodiments, the customer partiality vectors each comprises a magnitude that corresponds to the customer's belief in good that comes from an order associated with that value. In some embodiments, the customer partiality vectors comprise partiality vectors determined from a purchase history of the customer. In some embodiments, the method further comprises receiving a product identifier via the user device, and retrieving vectorized product characterizations associated with the product identifier from a product database. In some embodiments, the method further comprises determining a compatibility based on comparing the customer partiality vectors and the vectorized product characterizations and causing the shopping agent user interface to display the compatibility. In some embodiments, the compatibility comprises a score and the shopping agent user interface is configured to display a visual representation of the score. In some embodiments, the product identifier is received from the shopping agent user interface via one or more of a barcode, a Radio Frequency Identification (RFID) tag, a photograph, a product name, and a brand name. In some embodiments, the method further comprises recommending one or more products to purchase for the customer based on the customer partiality vectors of the customer. In some embodiments, the customer is associated with the shopping agent based on one or more of a current location of the shopping agent, one or more customer orders, and a customer selection received in the shopping agent user interface.

In some embodiments, an apparatus for providing shopping agent assistance comprises a non-transitory storage medium storing a set of computer readable instructions and a control circuit configured to execute the set of computer readable instructions which causes to the control circuit to: provide, via a communication device coupled to the control circuit, a shopping agent user interface on a user device associated with a shopping agent, associate a customer with the shopping agent, retrieve at least one customer value vector of the customer from a customer profile database storing customer partiality vectors for a plurality of customers, the customer partiality vectors comprise customer value vectors, and cause, via the communication device, the at least one customer value vector of the customer to be displayed on the shopping agent user interface.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

This application is related to, and incorporates herein by reference in its entirety, each of the following U.S. provisional applications listed as follows by application number and filing date: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec. 20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,804 filed Mar. 15, 2017; 62/471,830 filed Mar. 15, 2017; 62/479,525 filed Mar. 31, 2017; 62/480,733 filed Apr. 3, 2017; 62/482,863 filed Apr. 7, 2017; 62/482,855 filed Apr. 7, 2017; 62/485,045 filed Apr. 13, 2017; Ser. No. 15/487,760 filed Apr. 14, 2017; Ser. No. 15/487,538 filed Apr. 14, 2017; Ser. No. 15/487,775 filed Apr. 14, 2017; Ser. No. 15/488,107 filed Apr. 14, 2017; Ser. No. 15/488,015 filed Apr. 14, 2017; Ser. No. 15/487,728 filed Apr. 14, 2017; Ser. No. 15/487,882 filed Apr. 14, 2017; Ser. No. 15/487,826 filed Apr. 14, 2017; Ser. No. 15/487,792 filed Apr. 14, 2017; Ser. No. 15/488,004 filed Apr. 14, 2017; Ser. No. 15/487,894 filed Apr. 14, 2017; 62/486,801, filed Apr. 18, 2017; 62/510,322, filed May 24, 2017; 62/510,317, filed May 24, 2017; Ser. No. 15/606,602, filed May 26, 2017; and 62/513,490, filed Jun. 1, 2017.

What is claimed is:

1. A system for providing customer service agent assistance, comprising:
  a customer profile database storing customer partiality vectors for a plurality of customers, the customer partiality vectors comprise customer value vectors;
  a product database storing vectorized product characterizations of a plurality of products;
  a communication device configured to communicate with a plurality of user devices associated with customer service agents and a plurality of customer service kiosks; and
  a control circuit coupled to the customer profile database and the communication device, the control circuit being configured to:
    provide, via the communication device, a customer service agent user interface on a user device associated with a customer service agent;
    establish a customer service session between the user device and a customer service kiosk;
    identify a particular customer via the customer service kiosk;
    retrieving customer partiality vectors for the particular customer from the customer profile database;
    receive a product identifier via the customer service kiosk;
    retrieve vectorized product characterizations associated with the product identifier from the product database;
    compare the customer partiality vectors with corresponding vectorized product characterizations associated with the product identifier to select a highlighted vectorized product characterization with a high degree of alignment with the customer partiality vectors;
    display, on the user device associated with the customer service agent, a selection of one or more content corresponding to the highlighted vectorized product characterization associated with the product identifier; and
    upon a content being selected by the customer service agent on the user device, cause the content to be displayed on the customer service kiosk.

2. The system of claim 1, wherein the customer partiality vectors each represents at least one of a person's values, preferences, affinities, and aspirations.

3. The system of claim 1, wherein the customer partiality vectors each comprises a magnitude that corresponds to the customer's belief in good that comes from an order associated with that value.

4. The system of claim 1, wherein the customer partiality vectors comprise partiality vectors determined from a purchase history of the particular customer.

5. The system of claim 1, wherein the control circuit is further configured to:
  select one or more attributes associated with the product identifier as relevant attributes based on the customer partiality vectors; and
  cause the customer service agent user interface to display the relevant attributes.

6. The system of claim 1, wherein the control circuit is further configured to:
  select a script for communicating with the particular customer based on the customer partiality vectors for the particular customer; and
  cause the customer service agent user interface to display the script to the customer service agent.

7. The system of claim 1, wherein the control circuit is further configured to:
  recommend one or more products for purchase by the particular customer based on the customer partiality vectors for the particular customer.

8. The system of claim 1, wherein the control circuit is further configured to:
  select the customer service agent from a plurality of customer service agents based on the customer partiality vectors for the particular customer.

9. A method for customer service agent assistance, comprising:
  providing, with a control circuit and a communication device coupled to the control circuit, a customer service agent user interface on a user device associated with a customer service agent;
  establishing a customer service session between the user device and a customer service kiosk;
  identifying via the customer service kiosk a particular customer;
  retrieving, with the control circuit, customer partiality vectors of the particular customer from a customer profile database storing customer partiality vectors for a plurality of customers, the customer partiality vectors comprise customer value vectors;
  receiving a product identifier via the customer service kiosk;
  retrieving vectorized product characterizations associated with the product identifier from a product database, the product database storing vectorized product characterizations of a plurality of products;
  comparing the customer partiality vectors with corresponding vectorized product characterizations associated with the product identifier to select a highlighted vectorized product characterization with a high degree of alignment with the customer partiality vectors;

displaying, on the user device associated with the customer service agent, a selection of one or more content corresponding to the highlighted vectorized product characterization associated with the product identifier; and upon a content being selected by the customer service agent on the user device, causing the content to be displayed on the customer service kiosk.

10. The method of claim 9, wherein the customer partiality vectors each represents at least one of a person's values, preferences, affinities, and aspirations.

11. The method of claim 9, wherein the customer partiality vectors each comprises a magnitude that corresponds to the customer's belief in good that comes from an order associated with that value.

12. The method of claim 9, wherein the customer partiality vectors comprise partiality vectors determined from a purchase history of the particular customer.

13. The method of claim 9, further comprising:
selecting one or more attributes associated with the product identifier as relevant attributes based on the customer partiality vectors; and
causing the customer service agent user interface to display the relevant attributes.

14. The method of claim 9, further comprising:
select a script for communicating with the particular customer based on the customer partiality vectors for the particular customer; and
cause the customer service agent user interface to display the script to the customer service agent.

15. The method of claim 9, further comprising:
recommending one or more products for purchase by the particular customer based on the customer partiality vectors for the particular customer.

16. The method of claim 9, further comprising:
selecting the customer service agent from a plurality of customer service agents based on the customer partiality vectors for the particular customer.

17. An apparatus for mapping a space comprising:
a non-transitory storage medium storing a set of computer readable instructions; and
a control circuit configured to execute the set of computer readable instructions which causes to the control circuit to:
provide, via a communication device coupled to the control circuit, a customer service agent user interface on a user device associated with a customer service agent;
identify via a customer service kiosk a particular customer;
retrieve at least one customer partiality vectors for the particular customer from a customer profile database storing customer partiality vectors of a plurality of customers, the customer partiality vectors comprise customer value vectors;
receive a product identifier via the customer service kiosk;
retrieve vectorized product characterizations associated with the product identifier from a product database, the product database storing vectorized product characterizations of a plurality of products;
compare the customer partiality vectors with corresponding vectorized product characterizations associated with the product identifier to select a highlighted vectorized product characterization with a high degree of alignment with the customer partiality vectors;
display, on the user device associated with the customer service agent, a selection of one or more content corresponding to the highlighted vectorized product characterization associated with the product identifier; and
upon a content being selected by the customer service agent on the user device, cause the content to be displayed on the customer service kiosk.

* * * * *